United States Patent
Scott et al.

(10) Patent No.: US 12,463,689 B2
(45) Date of Patent: Nov. 4, 2025

(54) VEHICULAR ADAPTIVE DISTRIBUTED ANTENNA SYSTEMS

(71) Applicant: Molex, LLC, Lisle, IL (US)

(72) Inventors: Eric Scott, Kitchener (CA); Guido Dornbusch, Bochum (DE)

(73) Assignee: Molex, LLC

( * ) Notice: Subject to any disclaimer, the term of this patent is extended or adjusted under 35 U.S.C. 154(b) by 26 days.

(21) Appl. No.: 18/202,303

(22) Filed: May 26, 2023

(65) Prior Publication Data

US 2023/0387979 A1    Nov. 30, 2023

Related U.S. Application Data

(60) Provisional application No. 63/345,908, filed on May 26, 2022.

(51) Int. Cl.
*H04B 7/06* (2006.01)
*H04W 28/24* (2009.01)

(52) U.S. Cl.
CPC ....... *H04B 7/0608* (2013.01); *H04B 7/06964* (2023.05); *H04W 28/24* (2013.01)

(58) Field of Classification Search
CPC ............. H04B 7/0608; H04B 7/06964; H04B 7/0404; H04B 7/0413; H04B 7/0693; H04B 7/0817; H04B 7/0834; H04B 7/0877; H04W 28/24
See application file for complete search history.

(56) References Cited

U.S. PATENT DOCUMENTS

| | | | |
|---|---|---|---|
| 11,063,622 B2 * | 7/2021 | Roe | H04B 1/006 |
| 2006/0025097 A1 * | 2/2006 | Zahm | H04B 7/0808 455/133 |
| 2007/0191067 A1 * | 8/2007 | Nguyen | H04B 7/0641 455/562.1 |
| 2012/0121044 A1 * | 5/2012 | Ueno | H04B 7/0814 375/340 |
| 2015/0341057 A1 * | 11/2015 | Adamek | H04B 7/18506 370/384 |
| 2017/0094527 A1 | 3/2017 | Shattil et al. | |
| 2017/0136992 A1 * | 5/2017 | Hamada | G01S 5/0278 |
| 2018/0213541 A1 * | 7/2018 | Riess | H04B 7/0802 |
| 2018/0269915 A1 | 9/2018 | Spehl | |
| 2019/0267702 A1 * | 8/2019 | Shiroki | H01Q 21/28 |

(Continued)

FOREIGN PATENT DOCUMENTS

| | | |
|---|---|---|
| CN | 108769954 A | 11/2018 |
| WO | 2021096203 A1 | 5/2021 |
| WO | WO-2023056153 A1 * | 4/2023 ........... G01S 13/765 |

*Primary Examiner* — Sophia Vlahos

(57) ABSTRACT

Exemplary embodiments are disclosed of vehicular adaptive distributed antenna systems (V-ADAS) or distributed antenna farms. In exemplary embodiments, the system may include antennas that are sharable with one or more software defined radio (SDR) instances. In exemplary embodiments, the system may be configured to be operable for dynamic selection of the best antenna(s) for the specific situation, e.g., for high reliability communication and/or power and performance optimization, rural versus urban, shadowing effects of the vehicle itself and/or nearby obstructions, etc. In exemplary embodiments, the system may be configured to power down one or more of the remote active antennas that are not needed.

25 Claims, 32 Drawing Sheets

(56) References Cited

U.S. PATENT DOCUMENTS

| | | | |
|---|---|---|---|
| 2019/0274015 A1* | 9/2019 | Surnilla | H04W 76/30 |
| 2020/0371245 A1* | 11/2020 | Murphy | G01S 19/30 |
| 2022/0394508 A1* | 12/2022 | Kim | H04W 4/48 |
| 2024/0171206 A1* | 5/2024 | Li | H04B 1/3822 |

* cited by examiner

VEHICULAR ADAPTIVE DISTRIBUTED ANTENNA SYSTEMS

RELATED APPLICATION

This application claims priority to U.S. Provisional Patent Application Ser. No. 63/345,908 filed May 26, 2022, which is incorporated herein by reference in its entirety.

TECHNICAL FIELD

This disclosure generally relates to vehicular distributed antenna systems (vDAS).

DESCRIPTION OF RELATED ART

As motor vehicles become more data driven, the need to communicate with the external world becomes increasingly important. Individuals in vehicles often rely on personal mobile devices for streaming of music, communication with others, and even navigation. The motor vehicles themselves can also be in contact with external systems. Such communication allows for over-the-air updates from a central server, information about external conditions relevant to the vehicle through vehicle to everything (V2X) communication, navigational information, sensor sharing, and high accuracy positioning. If the vehicle is intended to have autonomous driving features, then having the ability to provide sensed data to a central server can allow for receipt of improved driving algorithms. Thus, there are numerous reasons for providing data to and from a motor vehicle as well as directly between vehicles, vehicles and vulnerable road users, like pedestrians and cyclists, and vehicles and infrastructure, such as traffic lights.

As vehicles increase the number of antennas, however, this creates a more complicated system. For example, if V2X and regular cellular communication between a vehicle and network is desired, it is likely that two or more antenna systems will be used, where each antenna system may include multiple antennas. These antenna systems can be configured so that individual antennas are mounted in locations that are spaced apart and, for example, one antenna could be mounted towards the front of a vehicle while another antenna is mounted towards the rear of a vehicle to preferably provide 360 degree coverage. As the operation of the communication system can be important to safety systems and may be required for certain levels of autonomous control in a vehicle, certain individuals would appreciate further improvements in vehicular communication systems.

SUMMARY

This section provides a general summary of the disclosure and is not a comprehensive disclosure of its full scope or all of its features.

Exemplary embodiments are disclosed of vehicular distributed antenna systems (vDAS) or distributed antenna farms. In exemplary embodiments, the system may include antennas that are sharable with one or more software defined radio (SDR) instances. In exemplary embodiments, the system may be configured to be operable for dynamic selection of the best antenna(s) for the specific situation, e.g., for high reliability communication and/or power and performance optimization, rural versus urban, shadowing effects of the vehicle itself and/or nearby obstructions, etc. In exemplary embodiments, the system may be configured to power down one or more of the remote active antennas that are not needed.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present application is illustrated by way of example and not limited in the accompanying figures in which like reference numerals indicate similar elements and in which:

As shown in FIG. 2, SDR Application 1 is in communication with two reception antennas and one transmission antenna (2RX1T). And SDR Application 2 is in communication with four reception antennas and four transmission antennas (4RX4T).

As shown in FIG. 4, the SDR Application Instances 1 and 2 are sharing IQ data streams (DL IQ Stream 1, 2, and DL IQ Stream 3, 4) from multiple remote antennas.

DETAILED DESCRIPTION OF THE PREFERRED EMBODIMENTS

Figure 1:
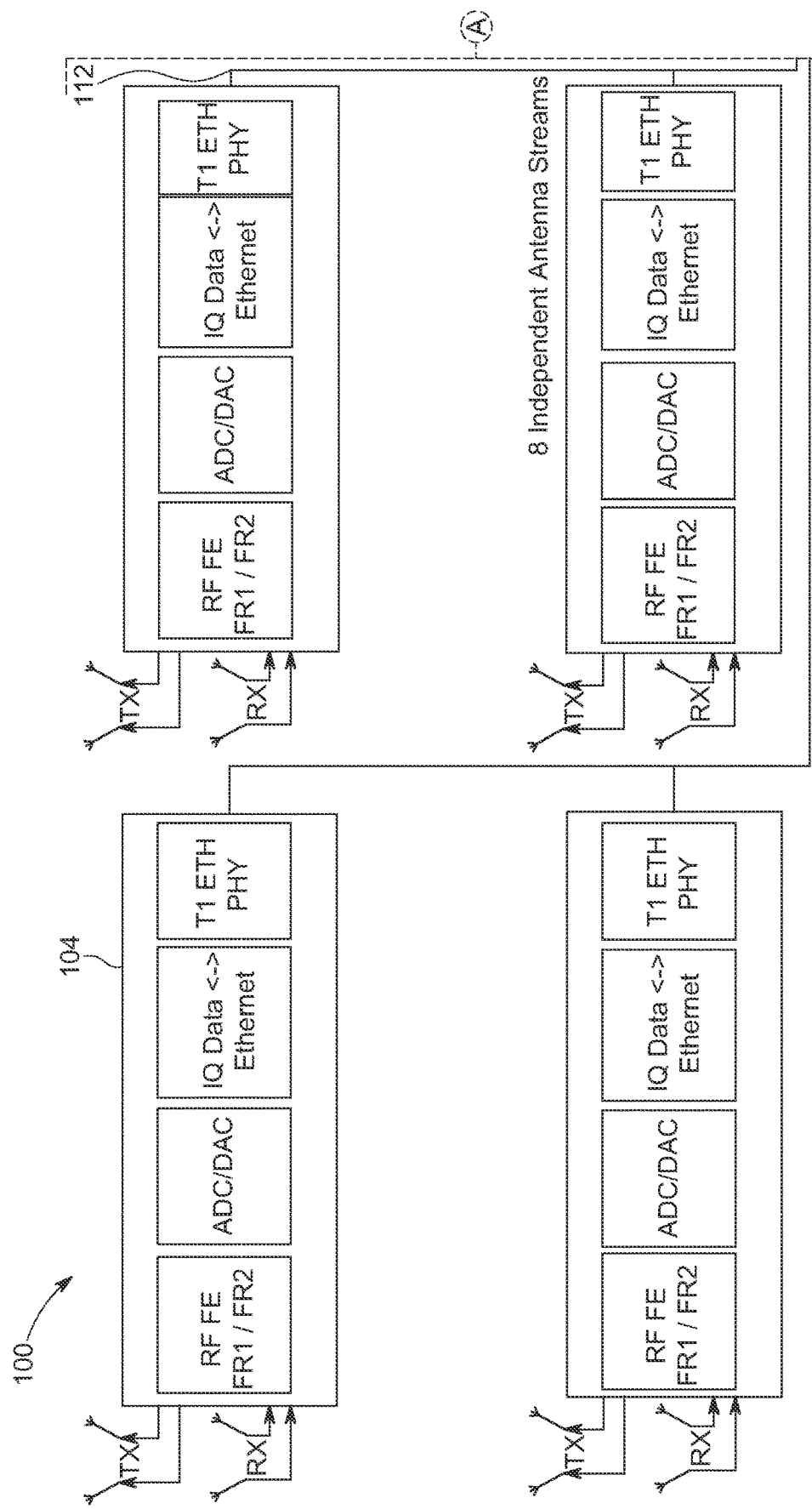
FIG. 1 is a block diagram of a vehicular distributed antenna system (vDAS) or distributed antenna farm according to an exemplary embodiment of the present disclosure.
Figure 1:
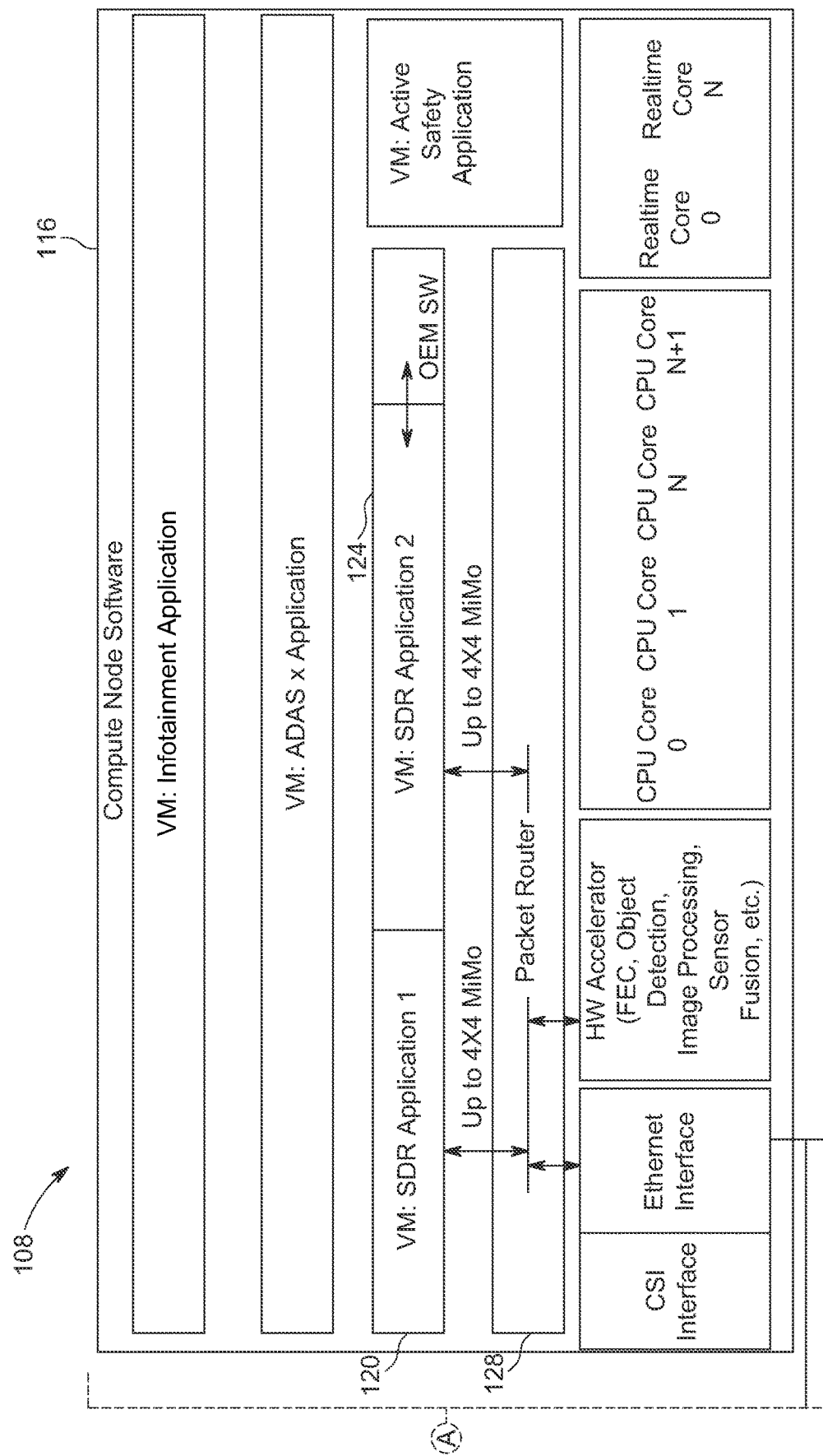

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

In a vehicular distributed antenna system (vDAS), multiple antennas may be distributed throughout a vehicle as contrasted with antennas being collocated within a modem/radio or single enclosure. Distributing antennas around a vehicle creates separation between the antenna, it being understood that antenna as used herein can refer to an enclosure or housing that supports one or more radiating elements such as a sharkfin antenna and antennas can be positioned in or on a vehicle. The antenna separation helps counteract shadowing effects and supports antenna diversity algorithms. Separating the antennas to different locations also allows for a better line of sight view to base stations or other vehicles by eliminating shadowing effect of the vehicle itself and/or nearby obstructions, such as houses as shown in FIGS. 12, 13, 14, and 15, etc. But moving the antennas farther away from the modem requires an increased length for the cable between the antenna and the modem, which increased cable length adds additional loss and reduces overall performance. To overcome the cable loss, the antenna may be provided with analog to digital conversion collocated with the antenna to thereby allow use of a digital link, which would not suffer from the same loss of signal as an analog cable.

Multiple software defined radio (SDR) instances may be used within a vehicle for a distributed antenna system (DAS) to accommodate for increased levels of user connectivity requiring high bandwidth and low latency communication. But the real estate available for antennas onboard a vehicle is limited. After recognizing the above, exemplary embodiments of vehicular adaptive distributed antenna systems or distributed antenna farms were developed and/or are disclosed herein in which the antennas may be configured to be shared with one or more SDR instances.

In exemplary embodiments, a vehicular distributed antenna system (vDAS) or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) includes one or more SDR instances and multiple remote active antennas that are shared by the SDR instance(s). A router layer (e.g., a packet router as shown in FIGS. 1-7, etc.) is added before the SDR stack allowing for dynamic selection of the best antenna(s) for the specific situation, e.g., for high reliability communication and/or power and performance optimization, rural versus urban, shadowing effects of the vehicle itself and/or nearby obstructions, etc. Accordingly, the best antenna(s) may be dynamically selected and adjusted for a specific situation, location, and/or orientation of the vehicle. For example, a roof mounted antenna may be selected as the best antenna (e.g., with a better line of sight view to a base station(s) or other vehicle(s), etc.) when the vehicle is in a rural location. As another example, a windshield mounted antenna may be selected as the best antenna (e.g., with a better line of sight view to a base station(s) or other vehicle(s), etc.) when the vehicle in an urban location. In addition, attenuation due to changing weather conditions may further implicate which antenna (and power level) is preferred for a particular location and vehicle orientation. The dynamic selection of the best antenna(s) may depend on required download and upload (DL/UL) needs and/or gain per antenna (e.g., bad reception on one side of the vehicle, etc.). In addition, one or more of the remote active antennas that are not needed for DL/UL may be powered down to save power, e.g., to thereby reduce electrical power consumption and increase the range of an electrical vehicle, etc.

The remote active antennas may include one or more antenna elements configured to be operable with GPS, Wi-Fi, Bluetooth, other wireless connectivity, etc. The one or more SDR instances may include one SDR instance for OEM (original equipment manufacturer) and one SDR for the consumer/end user running on a vehicular compute node (e.g., central controller, zonal controller, etc.). There may be multiple "virtual" SDR instances in a central compute or central unit. An SDR may share SIM (subscriber identification module) info with an end user's mobile device (e.g., cell phone, etc.) such that the SDR and mobile device may share the same SIM and increase (e.g., double, etc.) the possible data rate.

In exemplary embodiments, the vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured for 5G/6G with optimal MIMO performance and full surround view for high bandwidth Vehicle to Network (V2N)/Vehicle to everything (V2X) applications. The system may include a vehicle NAD SDR, Consumer NAD SDR, and a relay/Mobile IAB (Integrated Access Backhaul). The system may be configured for targeting, among other frequencies, 5G FR1 (410 MHz-7.125 GHz) and 5G FR2 (24 GHz-52.6 GHz) frequency ranges. But exemplary embodiments disclosed herein are not limited to any specific frequency range(s). Other exemplary embodiments may be configured for other frequency range(s) (e.g., GPS, Wi-Fi, Bluetooth, other wireless connectivity, etc.) and/or configured with a distribution of antennas including mmWave Phased arrays or Sub 6G antenna elements.

With reference to the figures, FIG. 1 illustrates an exemplary embodiment of a vDAS or distributed antenna farm 100. The system 100 includes multiple remote active antennas 104 and a central compute node or central unit 108 onboard a vehicle. The active antennas 104 are in communication with the central compute node 108 via links 112.

In this example, the links 112 directly connect the active antennas 104 to the central compute node 108. In other exemplary embodiments, the active antennas 104 may be connected to the central compute node 108 via one or more switches. For example, the central compute node 108 may be in communication with the active antennas 104 via an In-Vehicle Network (IVN) (e.g., IVN 540 (FIG. 5), IVN 640 (FIG. 6), etc.). The In-Vehicle Network may comprise an Ethernet network including one or more Ethernet switches with different link speeds. In which case, communications between the active antennas 104 and the central compute node 108 may be routed independently and dynamically via the In-Vehicle Network. Naturally, protocols other than Ethernet are also suitable.

Figure 9:
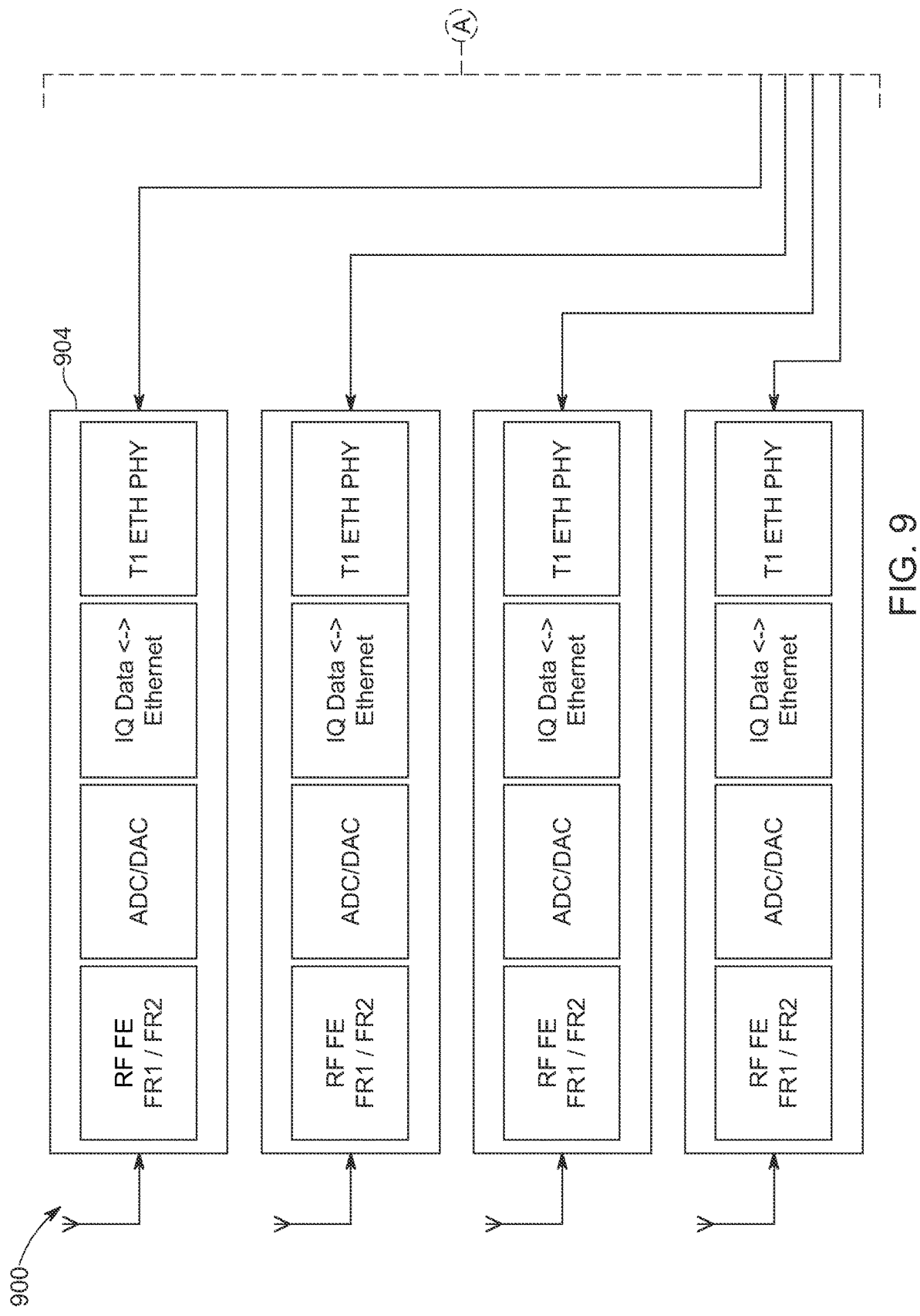
FIG. 9 is a block diagram of a vDAS or distributed antenna farm according to an exemplary embodiment of the present disclosure.
Figure 9:
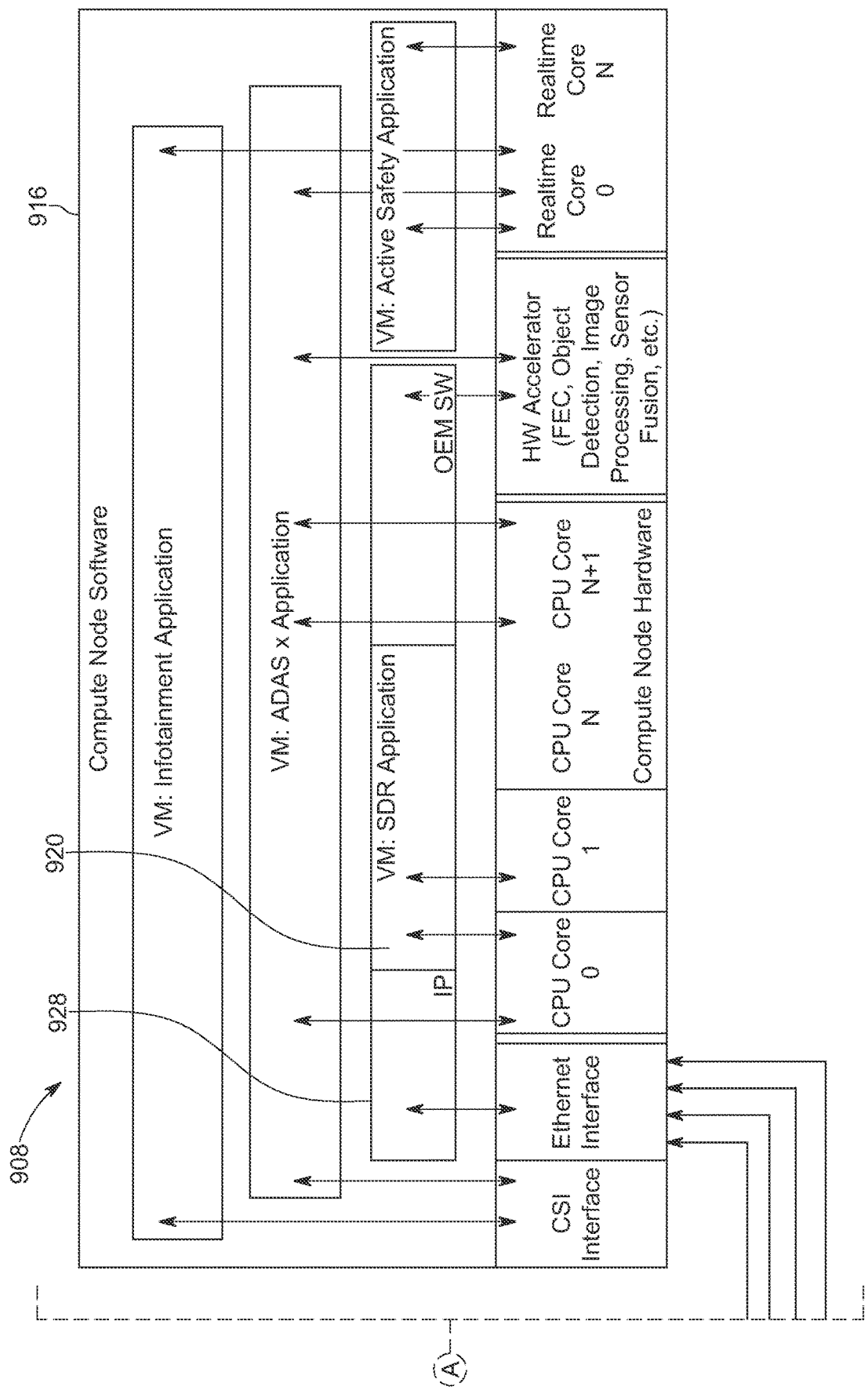

Also shown in FIG. 1 is the compute node software 116 of the vehicular central compute node or central unit 108. The compute node software 116 includes first and second software defined radio (SDR) instances 120 and 124. (VM: SDR Application 1 and VM: SDR Application 2). The antennas 104 are sharable by the SDR instances 120, 124, as disclosed herein and shown in FIGS. 2-4. The SDR instances 120, 124 may comprise or be configured to be operable as a modem for cellular, V2X, Wi-Fi, GPS, etc. Although the system 100 is illustrated with two SDR instances, other exemplary embodiments may include more or less than two SDR instances. For example, FIG. 9 illustrates an exemplary embodiment of a vDAS or distributed antenna farm 900 in which the compute node software 916 includes a single SDR instance 920.

With continued reference to FIG. 1, the compute node software 116 includes a packet router or router layer 128 before the SDR stack, which is configured such that the system 100 is operable for dynamically selecting the best antenna(s) 104 for the specific situation, e.g., for high reliability communication and/or power and performance optimization, rural versus urban, shadowing effects of the vehicle itself and/or nearby obstructions, etc. The dynamic selection of the best antenna(s) may depend on required download and upload (DL/UL) needs and/or gain per antenna (e.g., bad reception on one side of the vehicle, etc.). In addition, one or more of the remote active antennas 104 that are not needed for DL/UL may be powered down to save power, e.g., to thereby reduce energy consumption and increase range of an electric vehicle (EV), etc.

The system 100 is configured such that the active antennas 104 and SDR instances 120, 124 communicate digitally, e.g., with digital based communication from active antennas 104 to the SDR instances 120, 124. Accordingly, the links 112 between the active antennas 104 and the vehicular central compute node or unit 108 are digital links preferably with relatively high bandwidth, e.g., that are suitable for 5G eMBB/URLLC, V2X/RF BW MIMO, 25 Gb Automotive Ethernet, etc. In other embodiments, the links 112 may comprise 10 Gbps-Ethernet digital links or other digital links higher or lower than 10 Gbps, etc. For example, each link 112 may be operable for supporting 10 Gbps of bandwidth or higher (e.g., 10 Gbps, 25 Gbps, etc.) between the vehicular central compute node 108 and the corresponding one or more of the active antennas 104.

Each active antenna 104 of the system 100 may be identical to each other and include the same or similar components, although this is not required for all exemplary embodiments and it is contemplated that different configurations can be used for different locations in/on the vehicle. For the illustrated embodiment shown in FIG. 1, the four active antennas 104 will be described together for brevity. As shown in FIG. 1, each active antenna 104 includes two receive (RX) antenna elements and two transmit (TX) antennas elements. Each active antenna 104 also includes an RF front end (FE) module, an analog to digital converter/digital to analog converter (ADC/DAC), IQ Data Framer/Deframer (e.g., IQ Data Compression/Decompression and Time Synchronization module, etc.), and a high speed digital link channel (e.g., 10 Gbps-Ethernet channel, 25 Gbps-Ethernet channel, or some other desirable channel with suitable bandwidth, etc.). The RF front end module may include a power amplifier for transmission and a low-noise amplifier for reception.

Figure 2:
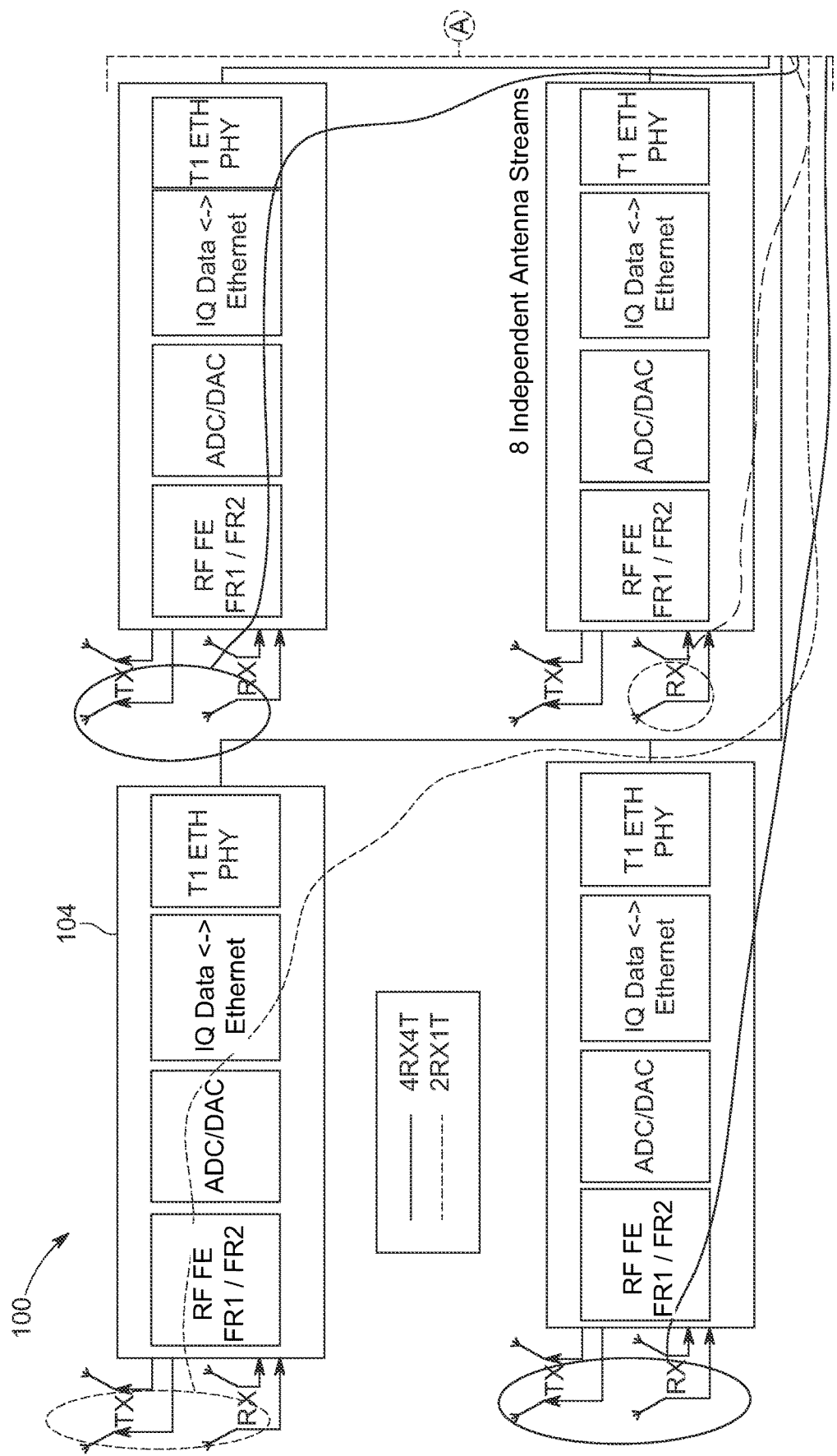
FIG. 2 is another block diagram of the vehicular adaptive distributed antenna system or distributed antenna farm shown in FIG. 1.
Figure 2:
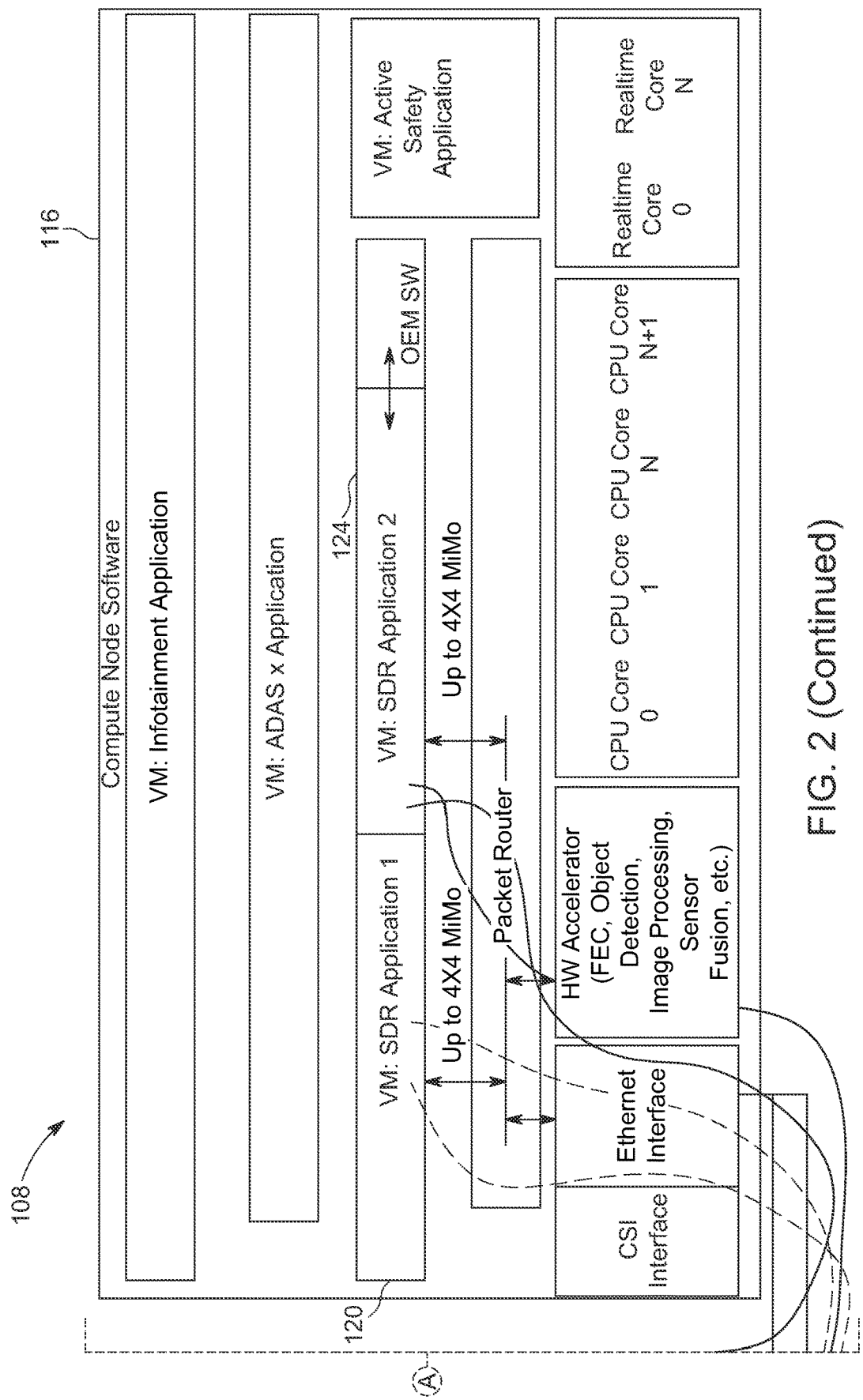

In the example shown in FIG. 2, the first SDR instance 120 (SDR Application 1) is in communication with two reception antennas and one transmission antenna (2RX1T). And the second SDR instance 124 (SDR Application 2) is in communication with four reception antennas and four transmission antennas (4RX4T).

Figure 3:
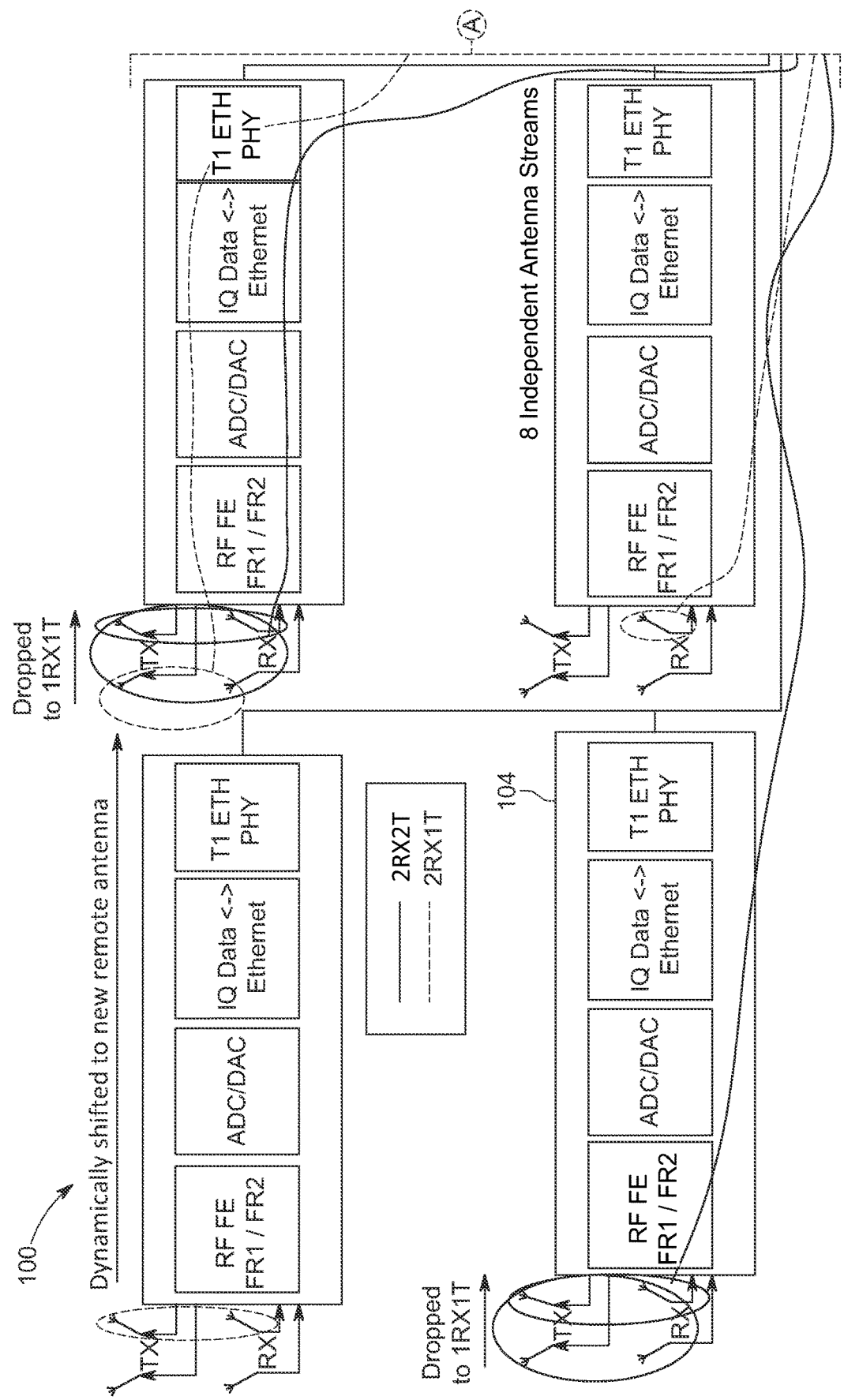
FIG. 3 is another block diagram of the vehicular adaptive distributed antenna system or distributed antenna farm shown in FIG. 2 after the system has dynamically switched to a different remote antenna for the SDR Application 1 and dynamically dropped from 2RX2T antennas to 1RX1T antennas for the SDR Application 2.
Figure 3:
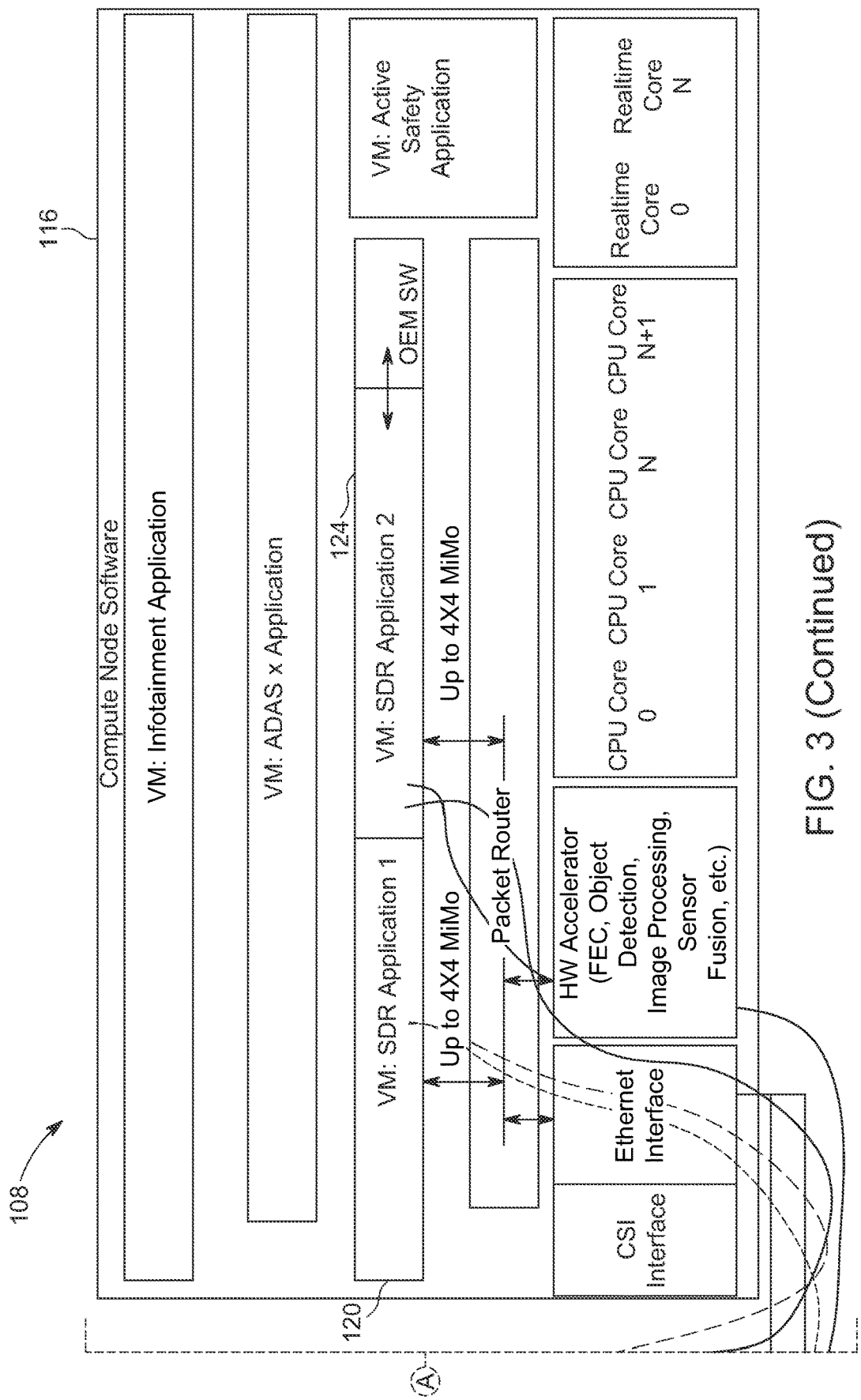

FIG. 3 illustrates the system 100 shown in FIG. 2 after the system 100 has dynamically switched to a different remote antenna for the first SDR instance 120 (SDR Application 1) and dynamically dropped from 2RX2T antennas to 1RX1T antennas for the second SDR instance 124 (SDR Application 2). The first SDR instance 120 (SDR Application 1) is in communication with two reception antennas and one transmission antenna (2RX1T). The second SDR instance 124 (SDR Application 2) is in communication with two reception antennas and two transmission antennas (2RX2T).

Figure 4:
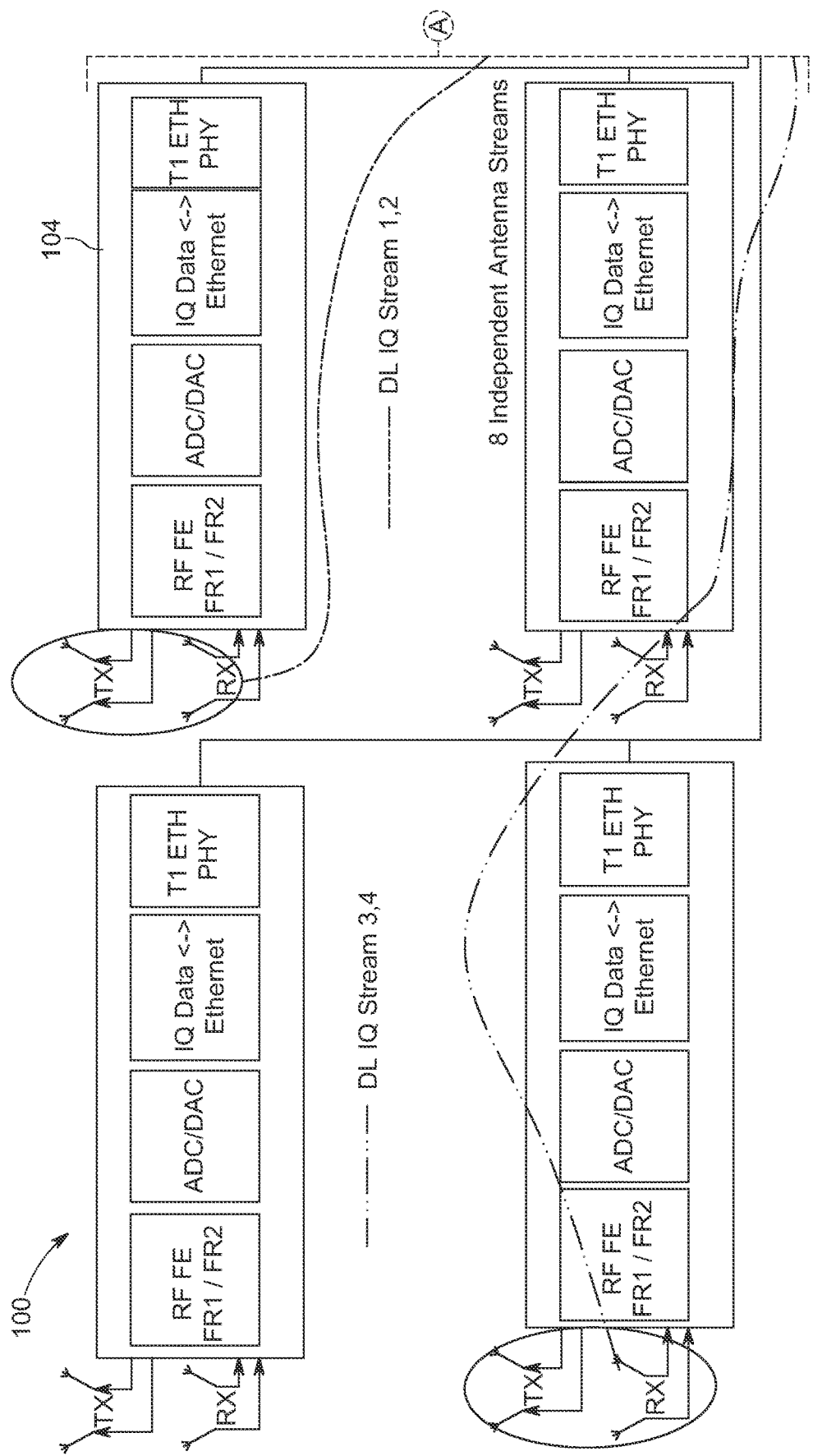
FIG. 4 is another block diagram of the vehicular adaptive distributed antenna system or distributed antenna farm shown in FIG. 1.
Figure 4:
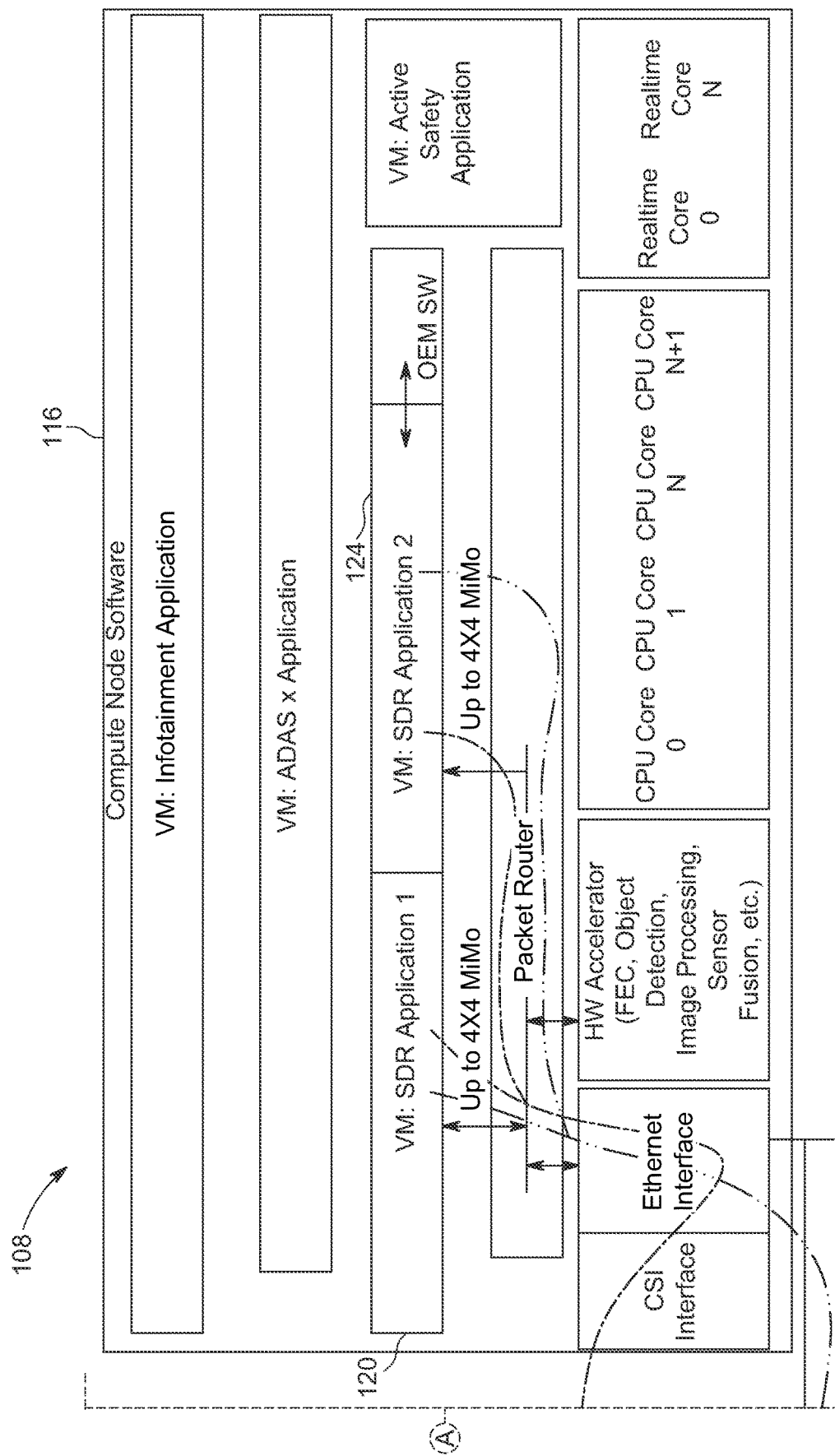

As shown in FIG. 4, the system 100 is configured such that the SDR instances 10, 124 (SDR Application Instances 1 and 2) share and receive both IQ data stream sets (DL IQ Stream 1, 2, and DL IQ Stream 3, 4) from multiple remote antennas 104.

Although the system 100 is illustrated with four active antennas 104, other exemplary embodiments may include more or less than four active antennas, e.g., depending on the configuration of the vehicle (e.g., vehicle type, size, shape, etc.) in which the system 100 will be installed. In addition, each active antenna 104 is illustrated with two transmit (TX) antenna elements and two receive (RX) antenna elements. In addition, the illustrated system 100 is also illustrated to have eight independent antenna streams and up to 4×4 MiMo for SDR instances 120, 124. But the system 100 and its active antennas 104 may be configured differently, e.g., with more or less than two TX antennas, with more or less than two RX antennas, with more or less than eight independent antenna streams, with antennas elements configured to be operable with GPS, Wi-Fi, 5G FR1, 5G FR2, other wireless connectivity, etc. Accordingly, exemplary embodiments disclosed herein should not be limited to any particular number of antennas having any particular number of antenna elements configured for any specific frequency range.

Figure 5:
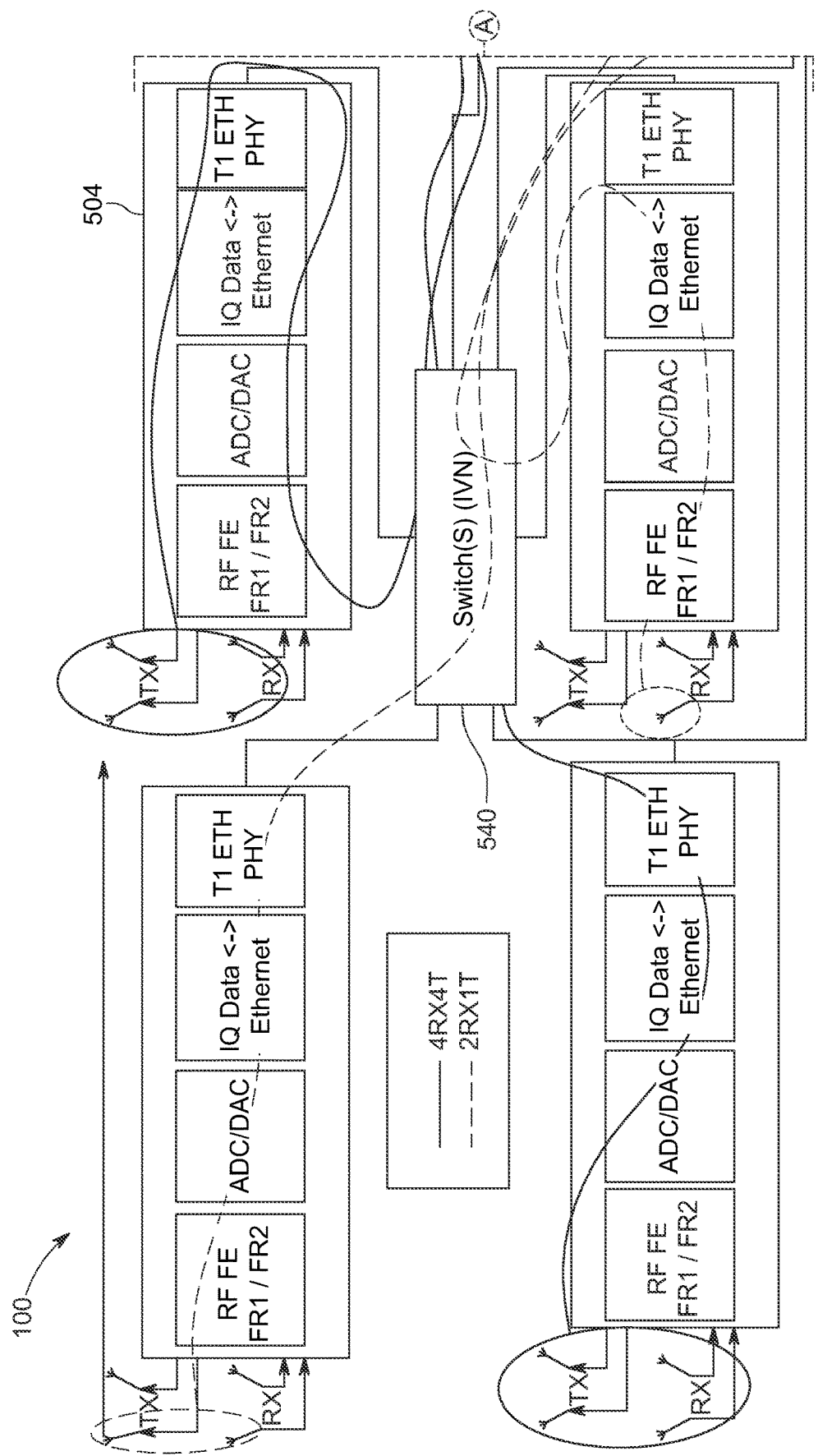
FIG. 5 is a block diagram of a vDAS or distributed antenna farm according to an exemplary embodiment of the present disclosure.
Figure 5:
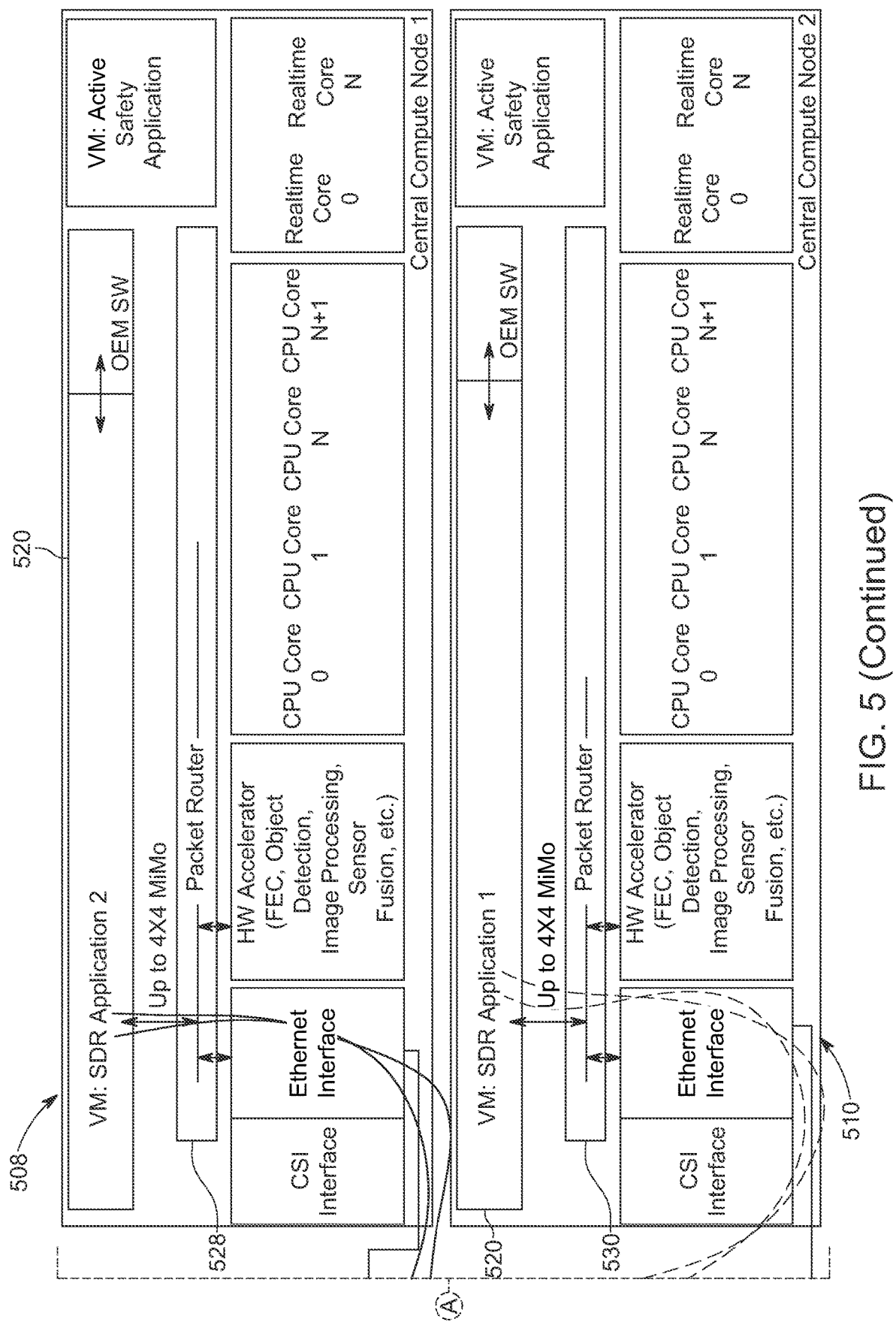

FIG. 5 illustrates a vDAS or distributed antenna farm 500 according to an exemplary embodiment of the present disclosure. The system 500 includes redundant first and second central compute nodes 508 and 510 (Central Compute Node 1 and Central Compute Node 2) and multiple remote active antennas 504. The first and second central compute nodes 508, 510 respectively include first and second software defined radio (SDR) instances 520, 524 (VM: SDR Application 1 and VM: SDR Application 2) and first and second router layers 528, 530. The first and second central compute nodes 508, 510 are in communication with multiple remote active antennas 504 via an In-Vehicle Network (IVN) 540. The In-Vehicle Network 540 may comprise an Ethernet network including one or more Ethernet switches with different link speeds. Traffic or communications between the active antennas 504 and the first and second central compute nodes 508, 510 may be routed independently and dynamically via the In-Vehicle Network 540. In this example, the first SDR instance 520 (SDR Application 1) is in communication with two reception antennas and one transmission antenna (2RX1T). The second SDR instance 524 (SDR Application 2) is in communication with four reception antennas and four transmission antennas (2RX2T).

Figure 6:
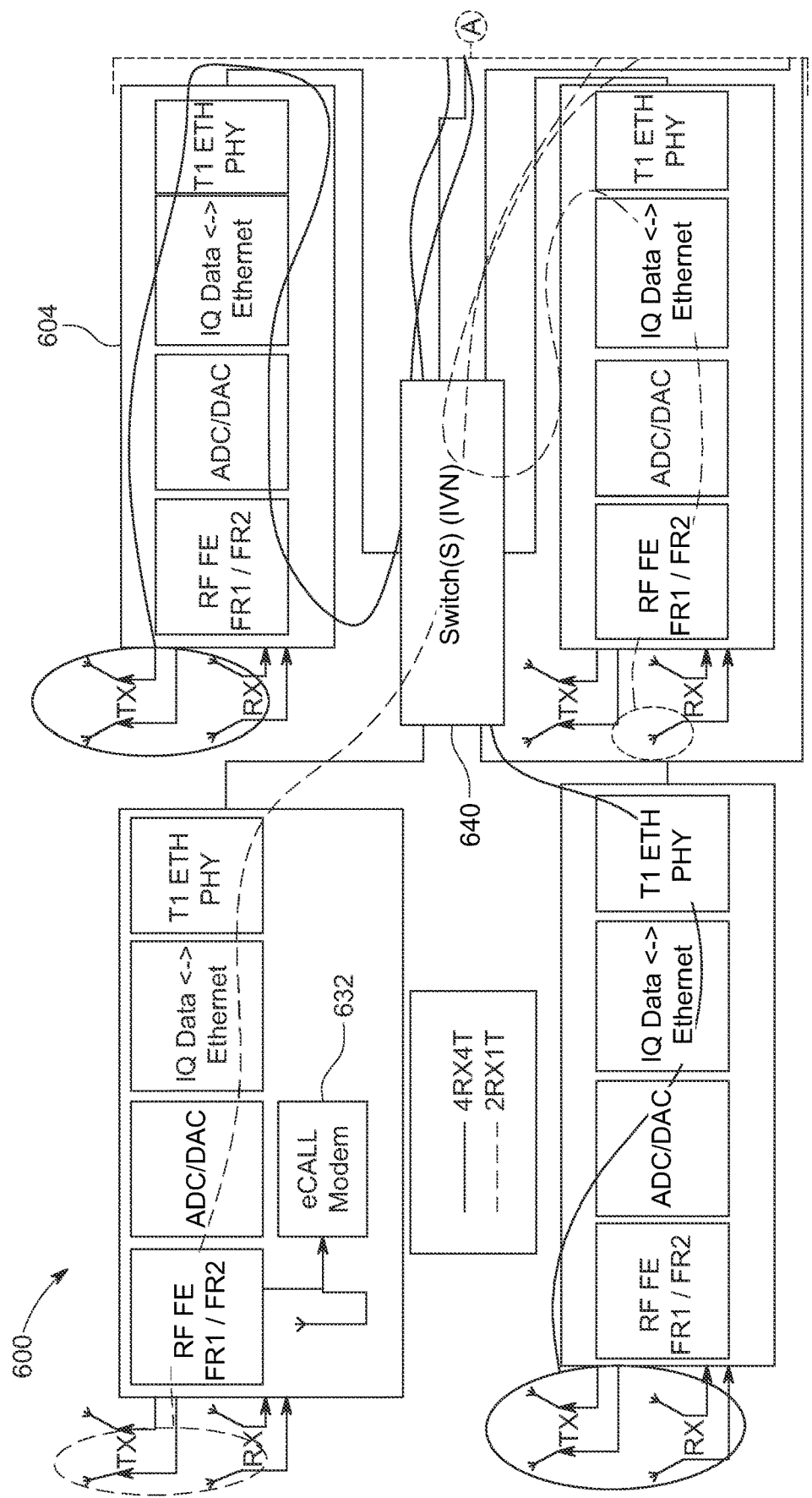
FIG. 6 is a block diagram of a vDAS or distributed antenna farm according to an exemplary embodiment of the present disclosure.
Figure 6:
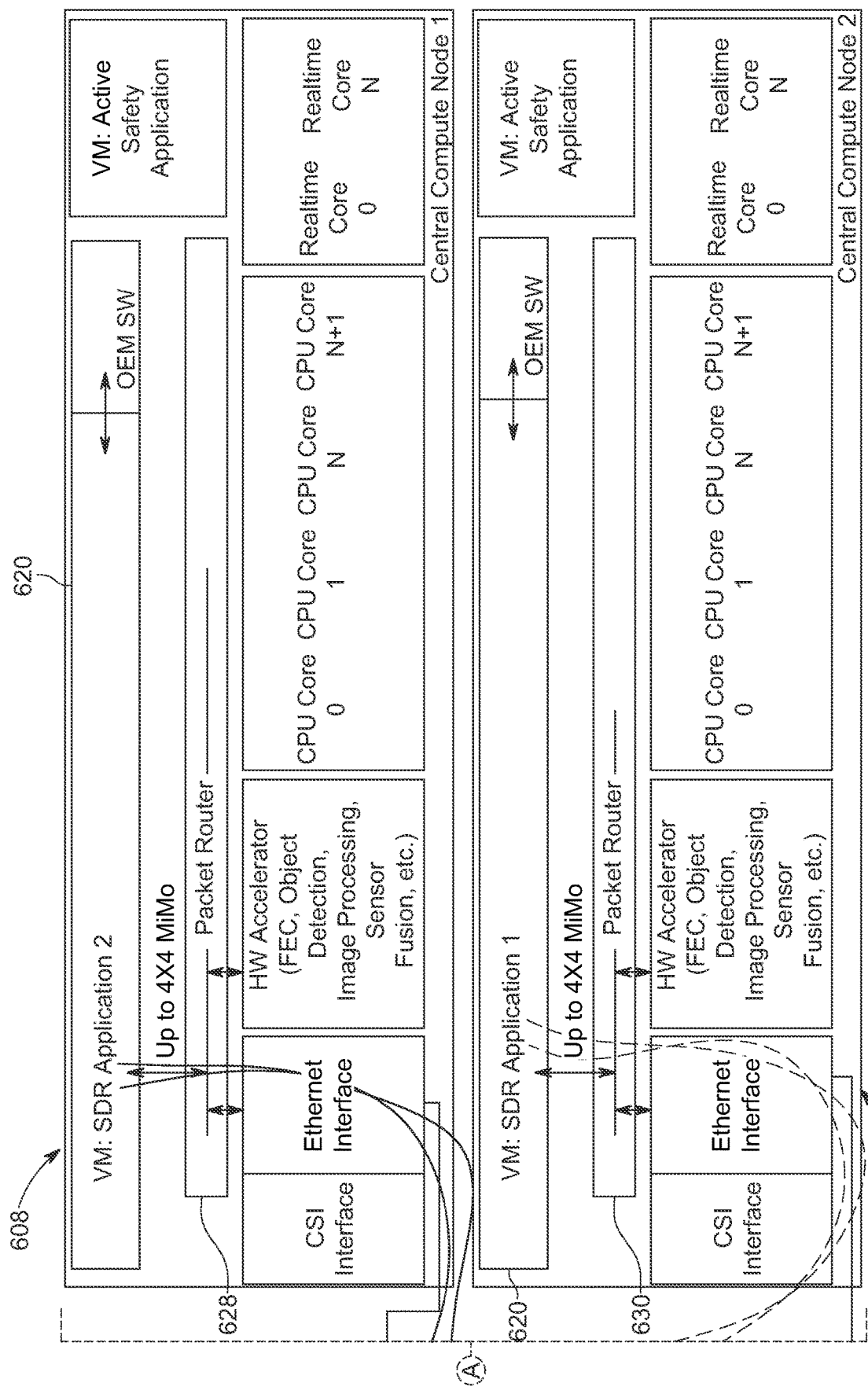

FIG. 6 illustrates a vDAS or distributed antenna farm 600 according to an exemplary embodiment of the present disclosure. The system 600 includes redundant first and second central compute nodes 608 and 610 (Central Compute Node 1 and Central Compute Node 2) and multiple remote active antennas 604. One of the remote active antennas 604 includes an eCall Modem 632 and is operable for supporting specific eCall functionality in the event of a vehicle crash after which there may not be sufficient or reliable power to power the first and second central compute nodes 608, 610.

The first and second central compute nodes 608, 610 respectively include first and second software defined radio (SDR) instances 620, 624 (VM: SDR Application 1 and VM: SDR Application 2) and first and second router layers 628, 630. The first and second central compute nodes 608, 610 are in communication with multiple remote active antennas 604 via an In-Vehicle Network (IVN) 640. The In-Vehicle Network 640 may comprise an Ethernet network including one or more Ethernet switches with different link speeds. Traffic or communications between the active antennas 604 and the first and second central compute nodes 608, 610 may be routed independently and dynamically via the In-Vehicle Network 640. In this example, the first SDR instance 620 (SDR Application 1) is in communication with two reception antennas and one transmission antenna (2RX1T). The second SDR instance 624 (SDR Application 2) is in communication with four reception antennas and four transmission antennas (2RX2T).

Figure 7:
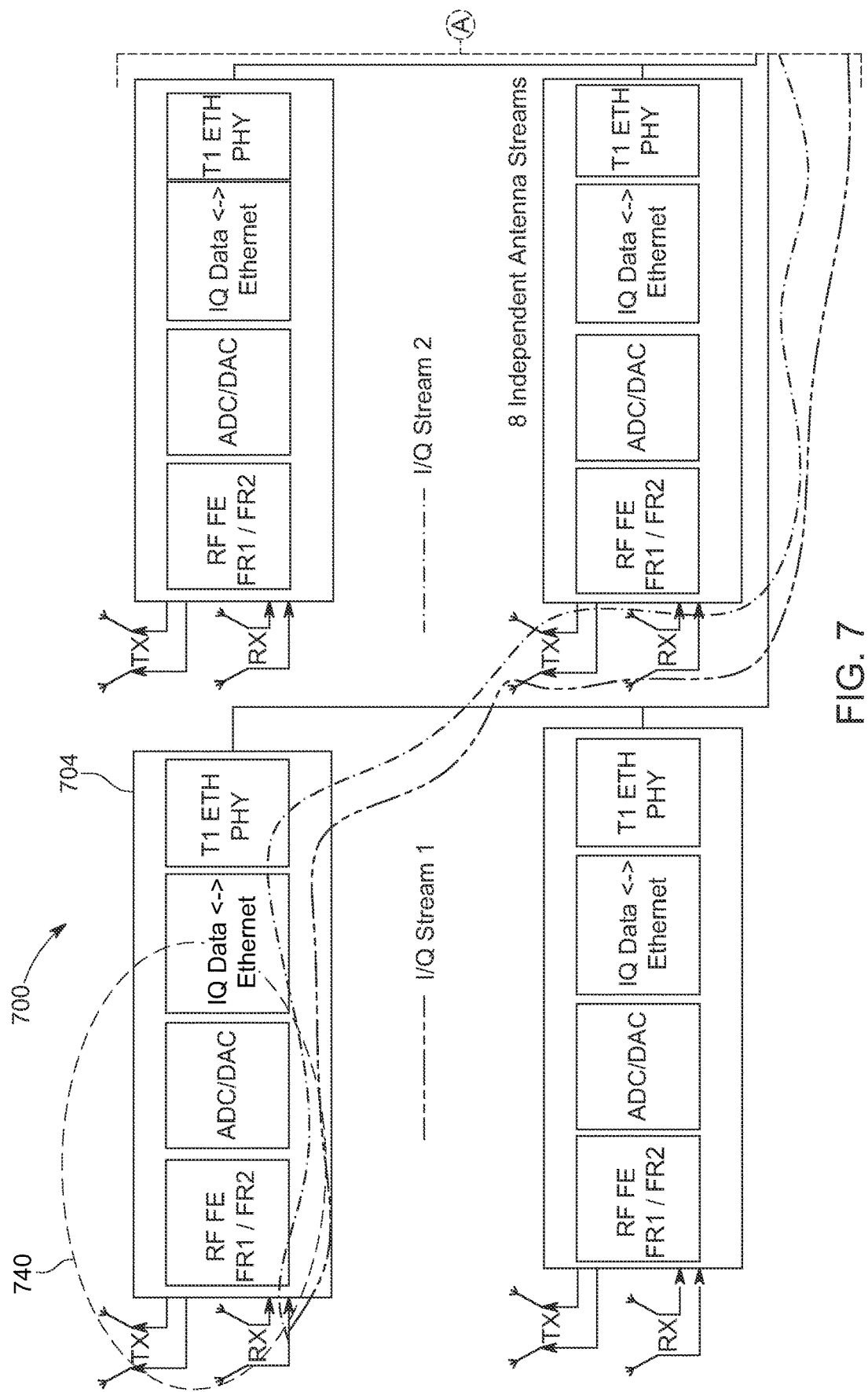
FIG. 7 is a block diagram of a vDAS or distributed antenna farm according to an exemplary embodiment of the present disclosure.
Figure 7:
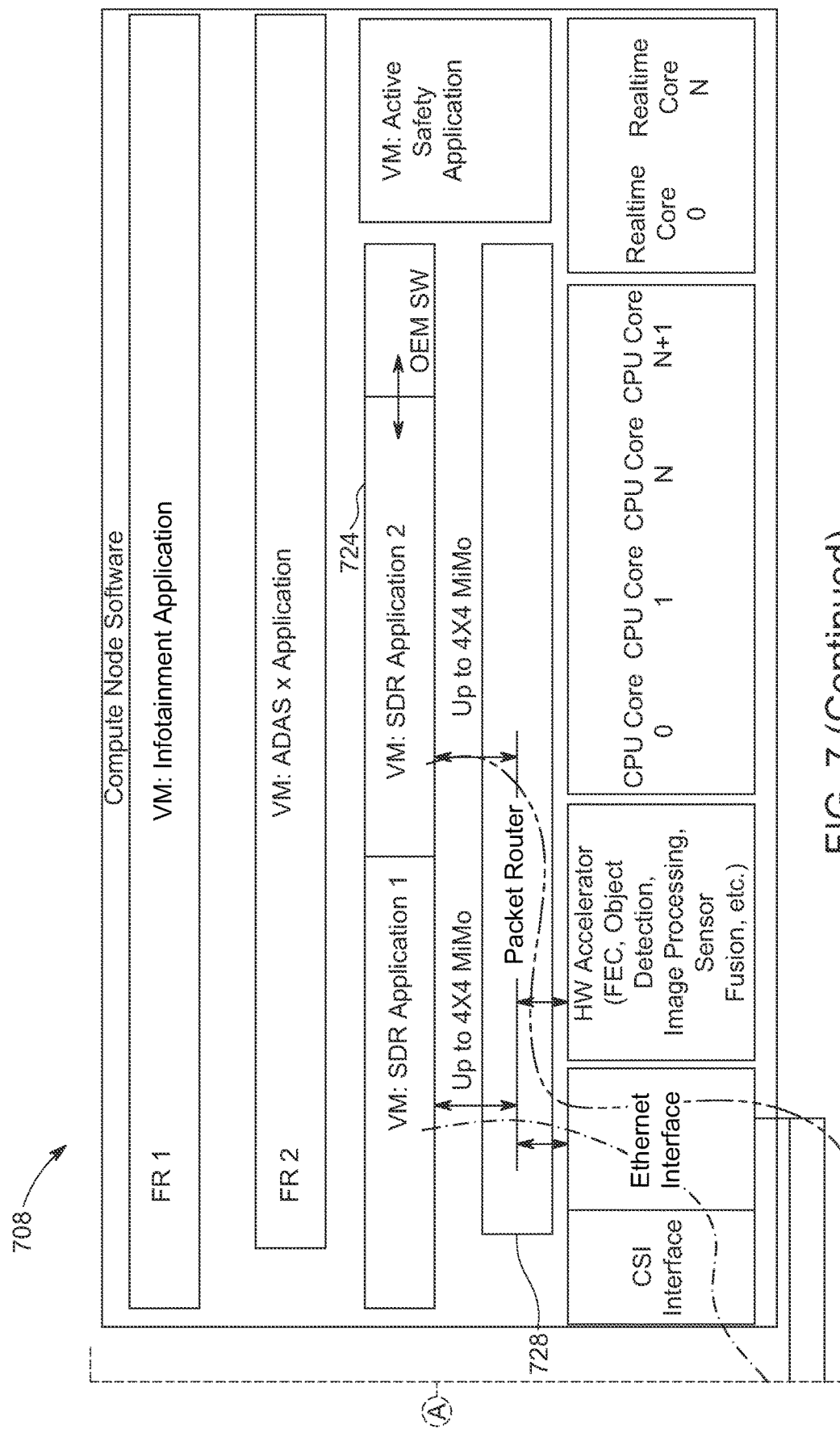

FIG. 7 illustrates a vDAS or distributed antenna farm 700 according to an exemplary embodiment of the present disclosure. The system 700 includes multiple remote active antennas 700 in communication with a central compute node or central unit 708. The central compute node 708 includes multiple software defined radio (SDR) instances 720, 724 (VM: SDR Application 1 and VM SDR Application 2) and a router layer 728. In this example, the first and second SDR instances 720, 724 (SDR Applications 1 and 2) are respectively receiving IQ Stream 1 and IQ Stream 2 from the same antenna source. Accordingly, a single antenna is providing independent IQ Streams to two SDRs with each IQ Stream looking at different carrier frequencies.

Figure 8:
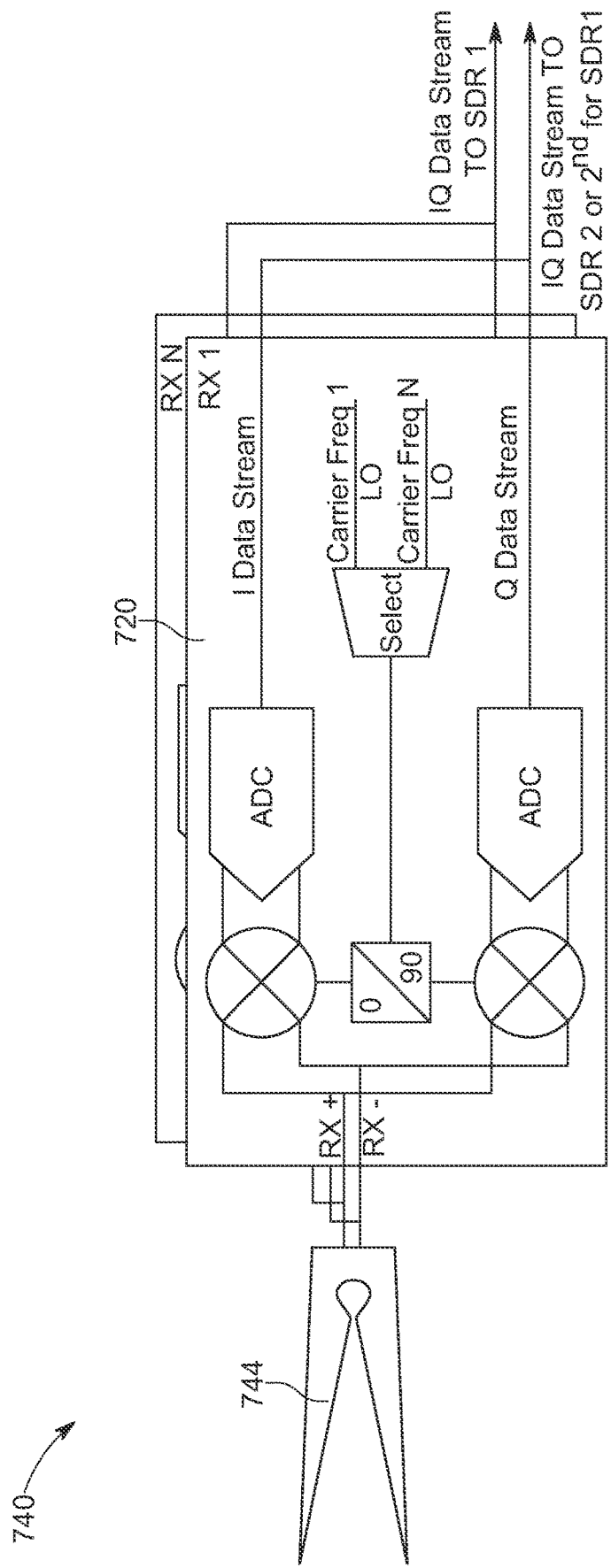
FIG. 8 illustrates the transceiver portion designated for the antenna shown in FIG. 7.

Also shown in FIGS. 7 and 8 is a transceiver 740. Generally. FIG. 8 represents a wideband antenna 744 allowing for separate carrier frequencies with a large separation. The wideband antenna is configured to cover a wide range of input frequencies, and the receiver is locking to one or more carriers with independent channels. Although a receive (RX) is shown FIG. 8 but transmit (TX) chain with DAC is also assumed.

FIG. 9 illustrates a vDAS or distributed antenna farm 900 according to an exemplary embodiment of the present disclosure. The system 900 includes multiple remote active antennas 904 in communication with a central compute node or central unit 908 including compute node software 916.

In this example, the central compute node 908 includes a single software defined radio (SDR) instance 920 (VM: SDR Application) and a router layer 928 before the SDR instance 920, which allows for dynamic selection of the best antenna(s) 904 for the specific situation, e.g., for high reliability communication and/or power and performance optimization, rural versus urban, shadowing effects of the vehicle itself and/or nearby obstructions, etc.

In exemplary embodiments, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to monitor and control an array of distributed antenna elements (e.g., antenna elements of the active antennas 104 (FIG. 1), etc.) onboard a vehicle. For example, the vehicular adaptive distributed antenna system or distributed antenna farm may be configured to monitor and control an array of distributed antenna elements for one or more of:
- optimization of energy savings, bandwidth requirements, priority of data stream, and/or vehicle location (e.g., selection of best antenna at that instance);
- sharing of IQ data steams (multi-radios)(e.g., V2X, Cellular Carrier x, Cellular Carrier x+1, etc.);
- GNSS IQ Sharing with Cellular IQ (e.g., for increased positioning capabilities with more antennas, etc.);
- time-division duplexing (TDD) including time sharing of antenna resources (e.g., GNSS, SDR instance(s), etc.);
- safety;
- eCALL/Stolen Vehicle Tracking (SVT) redundancy;
- antenna combining at remote location; and/or
- active digital link power management.

Regarding optimization of energy savings, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to reduce the power of the antenna(s) that are "not in use" by the radio. In this example, an antenna that is "not in use" includes the antenna not having enough signal level to support radio functions, or the use of the antenna is not necessary to satisfy the bandwidth requirement needs, or there is a better performing antenna in the system that can be used. By reducing power of one or more antenna(s) that are not in use, the overall energy usage by the telematics system may be reduced, which, in turn, may allow for an increased range of the electric vehicle (EV) equipped with the telematics system.

The system may be configured with energy efficient Ethernet (or other similar technology) to disable the transmitter when in low power state. The system may be configured to power down all but the RX receiver level circuits. For example, the system may power down the transceivers (analog to digital converter/digital to analog converter (ADC/DAC)), IQ Data Framers/Deframers, etc. The RX (receiver) side of the Ethernet link (or other digital link) may remain "active" allowing for adjustments to the active bands to be monitoring for power levels if preferred. In this example, "active" may refer to an antenna waking up to respond to an Ethernet request and then returning back to a low power state. Also in this example, power measurement can be represented by the pure RF power in the band and the signal to noise radio (SNR) of that band. In which case, a low SNR can mean that the signal is not useable and therefore can be treated as low power.

Figure 10A:
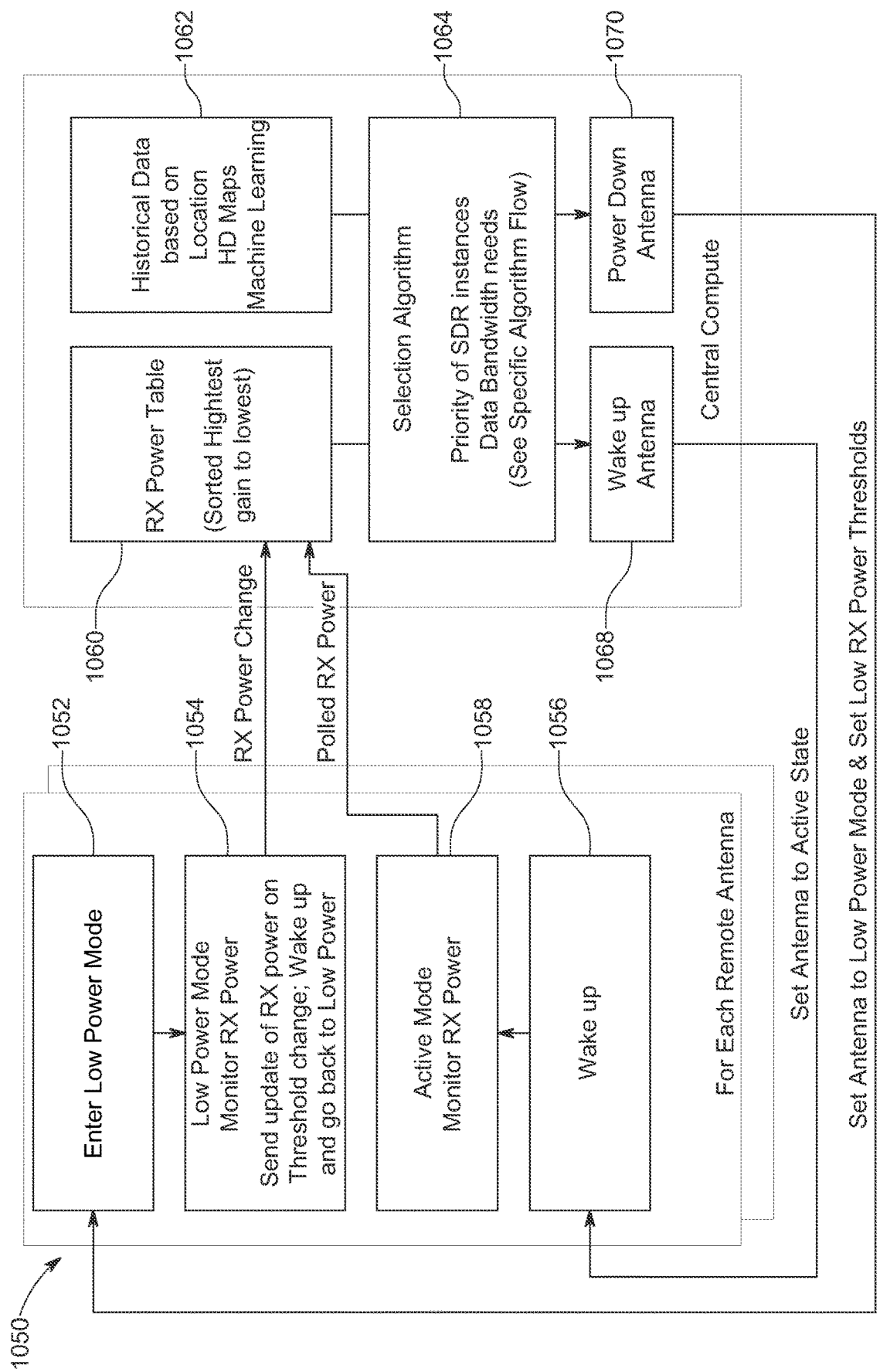
FIG. 10A is a flow chart illustrating an example power saving operation, which may be implemented in a vDAS or distributed antenna farm according to an exemplary embodiment of the present disclosure.

FIG. 10A illustrates an example method 1050 for providing (e.g., optimizing, etc.) energy savings, which may be implemented in a vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.). In this exemplary method, Low Power Mode includes the digital link in standby mode (e.g., energy efficient Ethernet (receiver RX side only mode)), transceivers (TRX) powered down, IQ Data Framers/Deframers powered down, and receiver power (RX PWR) signal strength monitor powered up. Active Mode includes actively participating in communications (receive (RX) and/or transmit (TX)) and providing RX power status on a regular basis (e.g., even if not active on a cellular network) to be used by a selection algorithm (e.g., FIG. 11, etc.).

As shown in FIG. 10A, the remote antenna(s) (e.g., antenna 104 shown in FIG. 1, etc.) may enter a low power mode at 1052. At 1054, the receive RX power is monitored, updates are sent of RX power on threshold change, the antenna wakes up and returns to the low power state.

At 1056, antenna(s) may wake up such that the antenna(s) in active mode monitor and poll the receive RX power at 1058. The RX power change from 1054 and the polled RX power from 1058 may then be sorted highest gain to lowest gain at 1060.

The RX gain rankings from 1060 and historical data based on location, high definition maps, machine learning from 1062 may be used at 1064 (e.g., FIG. 10A, FIG. 11, etc.) to select a best antenna(s) for the specific situation. The antenna(s) selected at 1064 may be woken up or set to active state at 1068 if not already in active mode. The antenna(s) not selected at 1064 may be powered down or set to low power mode with low RX power thresholds at 1070 if not already in low power mode.

Figure 10B:
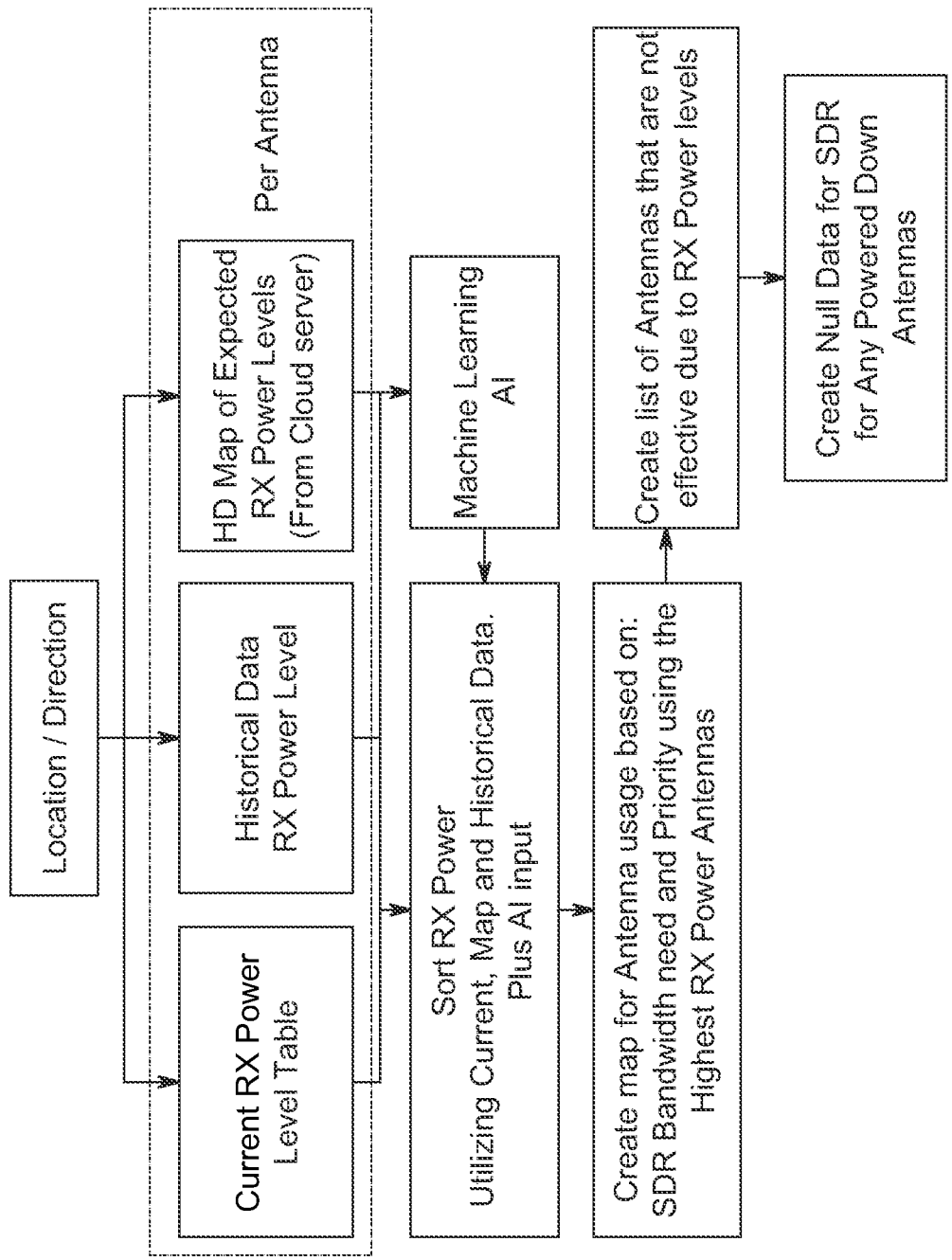
FIG. 10B is a diagram representing an example process of selecting an antenna(s) for power savings, which may be implemented in a vDAS or distributed antenna farm according to an exemplary embodiment of the present disclosure.

FIG. 10B is a diagram representing an example process of selecting an antenna(s) for power savings that may be used at 1064 in the method 1050 shown in FIG. 10A and implemented in a vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.).

As shown in FIG. 10B, the selection of antenna(s) for power savings can be based on one or more of location/ direction/orientation and for each antenna Current Rx Power Level Table, Historical Data Rx Power Level, and High Definition (HD) Map of Expected RX Power Levels (e.g., from cloud server, etc.). The selection of antenna(s) for power savings may also be based on number of antennas versus requested by SDR instances, SDR instances and priority, and throughput requirements per SDR instance.

The process includes sorting RX Power utilizing current, map, and historical data, and Machine Leaning (ML) Artificial Learning (AI) input. When sorting the RX power, the historical data is taken as the future state if current data for given antenna(s) is equal. If heading to location/direction at given speed changes, then historical data is adjusted based on upcoming locations so that the best antennas are already setup when the vehicle arrives. Machine learning is utilized to predict the antenna use patterns to support the sort algorithm.

The process also includes creating a map for antenna usage based on SDR bandwidth need and priority using the highest RX power antennas. The process further includes creating a list of antennas that are not effective due to RX power levels. NULL data is created for SDR for any powered down antennas. The NULL data stream may be effectively equivalent to a low power reception if the antenna was still powered and sending IQ data.

In exemplary embodiments, a system may use or rely upon artificial intelligence and machine learning to decide when to turn on and off specific antennas. In exemplary embodiments, the system may be operable for transitioning from one antenna to another based on history and learning. For example, the system may provide a low data rate stream for streaming video without any dropouts while also maintaining low power requirements low by limiting the number of antennas active.

Figure 11:
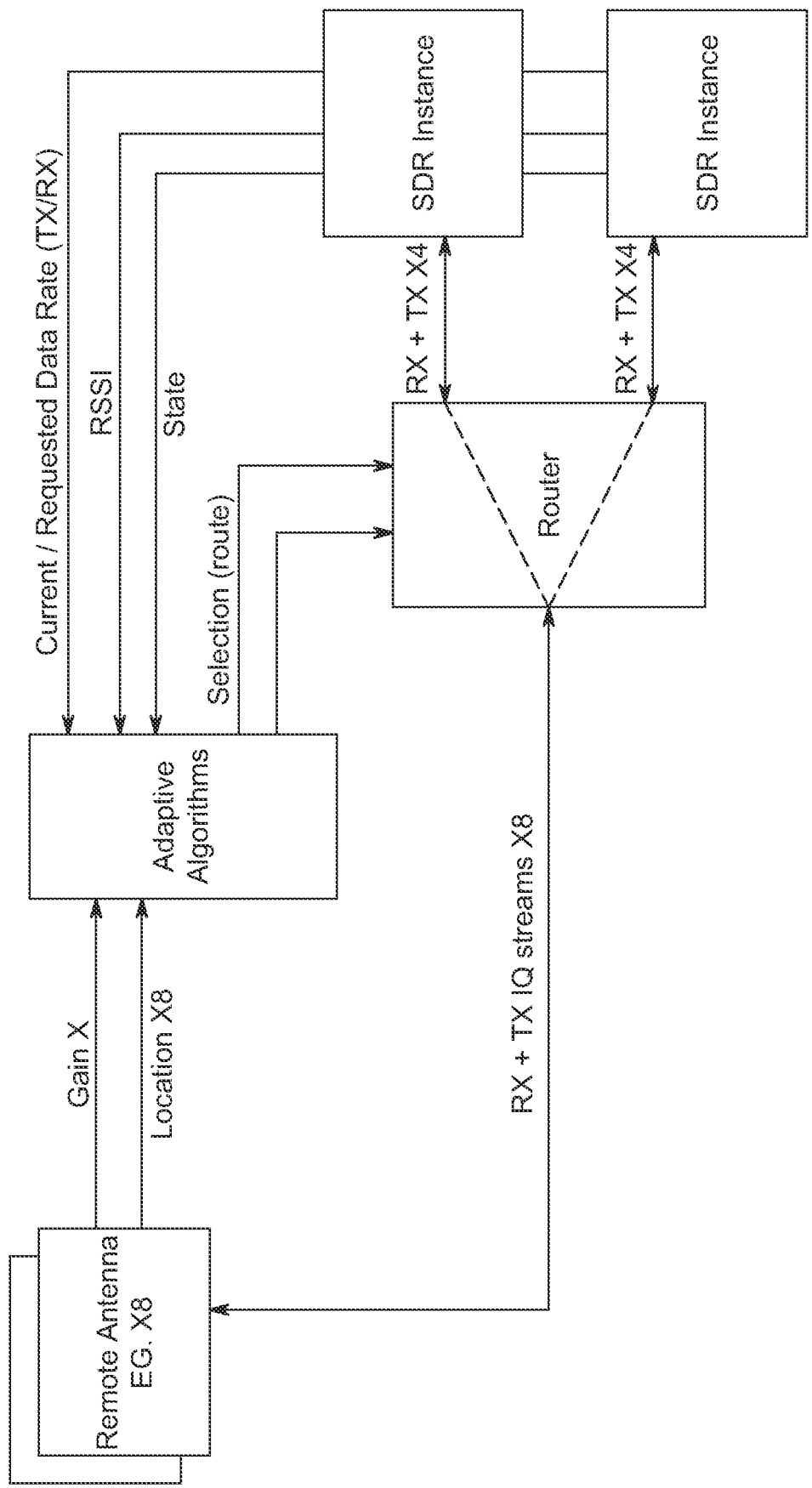
FIG. 11 is a flow chart illustrating an example antenna selection operation, which may be implemented in a vDAS or distributed antenna farm according to an exemplary embodiment of the present disclosure.
Figure 12:
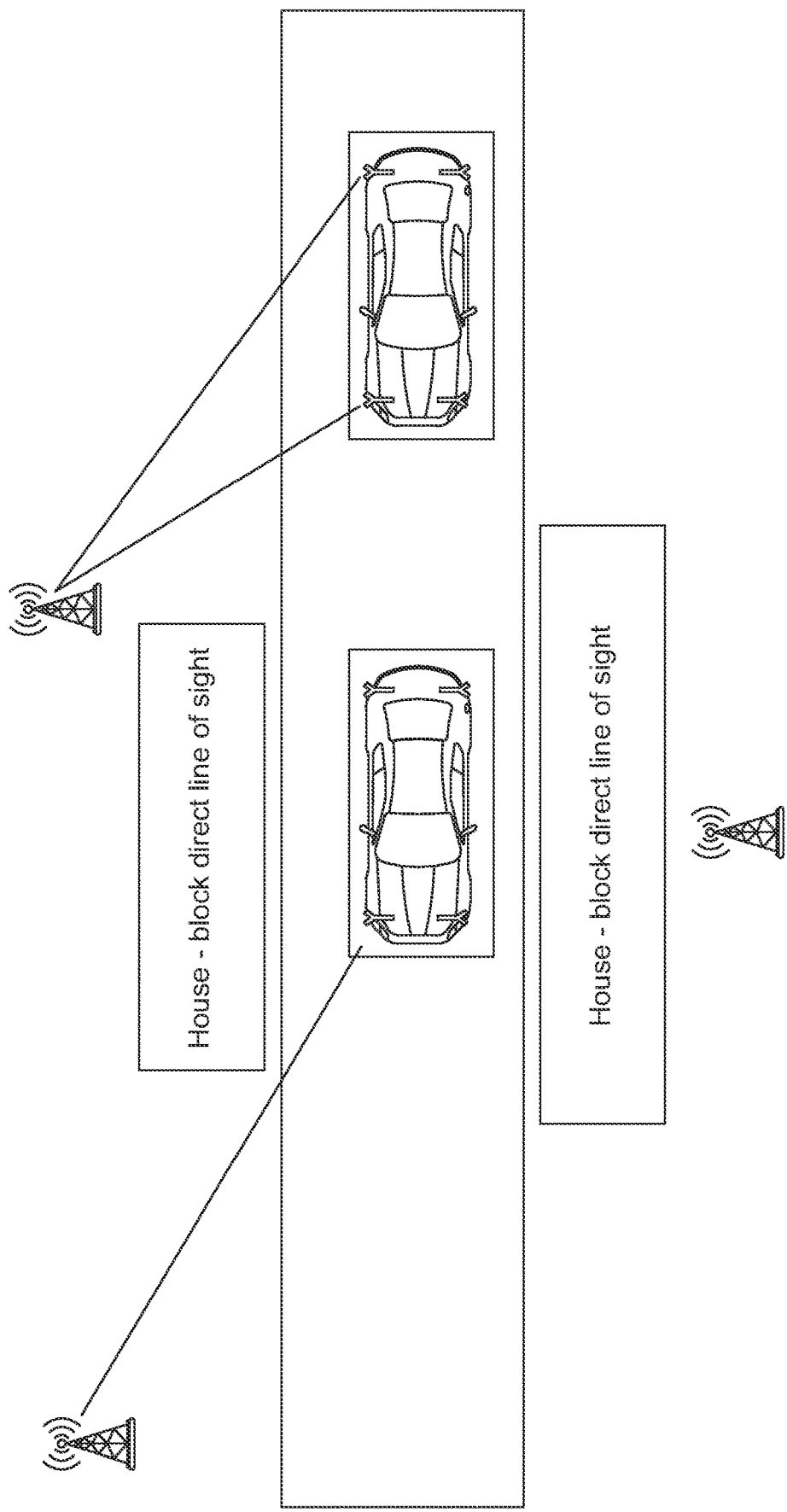
FIGS. 12, 13, 14, and 15 illustrate examples in which a vDAS or distributed antenna farm has selected different antenna(s) with better lines of sight to the base stations as the vehicle travels and the situation changes, e.g., relative locations of houses and a truck (FIG. 15) blocking direct lines of sight from some vehicle antennas to the base stations, etc.

FIG. 11 illustrates an example antenna selection operation that may be used at 1064 in the method 1050 shown in FIG. 10A and implemented in a vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.). FIG. 11 generally shows a routing function of the IQ streams based on the adaptive algorithm(s). The ranking and sorting may be based on (in order) highest receive gain, RSSI reported by SDRs (broadly, incoming (RX) performance/power measurements per antenna element), priority of SDR, and Data Rate expected. The data rate can limit the number of highly ranked antennas for SDR instance. For example, the lower the data rate needed, the lower the number of antennas needed. In addition, a single remote antenna may have multiple antenna elements, e.g., there may be two antenna elements per antenna such that the antenna may be repeated. Also, the router is operable for routing the IQ streams according to the adaptive algorithm(s). Each SDR instance is provided the IQ streams indicated by the adaptive algorithm(s) up to the number of existing antennas or the maximum required by the SR instance.

In FIG. 11, RSSI is the receive signal strength. And state is the current state of the SDR instance, e.g., idle or active. Although FIG. 11 provides an example having eight remote antennas, the example antenna selection operation shown in FIG. 1 may be used for other systems having more or less than eight remote antennas. In addition, a single antenna may have multiple antenna elements, such as two antenna elements per each antenna location, etc.

Regarding optimization of bandwidth requirements, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured such that RX antennas are activated based on the required bandwidth needed by the vehicle side user equipment. If the required throughput for a particular vehicle state is low, one or more antennas may be powered down. By powering down one or more antenna(s) that are not needed for the required throughput for the particular vehicle state, the overall energy usage by the telematics system may be reduced, which, in turn, may allow for an increased range of the electric vehicle (EV) equipped with the telematics system.

Optimization of bandwidth requirements may include deactivating or powering down antenna(s) based on a throughput algorithm and allowing the SDR instance(s) to believe that there are less antennas or providing a "NULL" data stream. The NULL data stream may be provided within the vehicle central compute node by keeping the link to the deactivated antenna powered down. Signal loss may be reported to the cellular network. Alternatively, it may be indicated to the cellular network that the number of antennas is being reduced. The NULL data stream may be effectively equivalent to a low power reception if the antenna was still powered and sending IQ data.

Regarding optimization of data stream priority, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to select which IQ data streams go to which SDR instance based on the priority of the SDR instances when there are two or more SDR instances within the vehicle. For example, the system may be configured such that the priority of the best antenna location(s) is routed to an OEM SDR instance that is responsible for safety features instead of routing to an end user SDR instance that is responsible for multimedia. Accordingly, the system may be configured to share a limited number of antenna locations within the vehicle based on priority of needed service.

Optimization of data stream priority may include monitoring the receive data strength at antenna locations and using this information to optimize the best location for the highest priority SDR Instance. RX information may be used to optimize the TX active antenna locations. The required TX/UL (transmit/upload) data rates may be used also to allow for the lower priority SDR instance to utilize a more optimal antenna location when the higher priority SDR instance is requiring low data rates (e.g., weighted round robin). Note the low priority antenna would always have an active antenna available for upload (UL) though it may just not have the best signal quality (therefore low data rates). An IQ data stream may also be sent to two independent SDR instances if the same frequency range requirements are covered for each SDR instance. For example, an IQ data stream may be sent to two independent SDR instances that have the same bandwidths of interest and that have different or the same carriers. See, for example, FIG. 4 illustrating the vehicular adaptive distributed antenna system or distributed antenna farm 100 wherein the first and second SDR instances 120, 1240 (SDR Application Instances 1 and 2) are sharing IQ data streams (DL IQ Stream 1, 2, and DL IQ Stream 3, 4) from multiple remote antennas 104.

Regarding optimization of vehicle location, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), etc.) may be configured to adjust which active antennas are used based on the location and orientation in 3D space of the vehicle, based on: previous learned signal strengths (history), high definitions maps of signal strength (downloaded/history), and/or artificial intelligence (AI). For example, the system may be configured to rely upon AI machine learning (ML) to learn routes taken by the vehicle and best antenna locations. The determination and selection of the best antenna location(s) may be based on time-of-day traffic patterns, weather, etc., which may differ from the high definition maps of signal strength. Accordingly, this may improve or optimize the system to have better performance (e.g., best performance possible, etc.) with reduced (e.g., minimal, etc.) energy usage. In contrast, using a non-optimal antenna would require longer usage due to retries, etc., which longer usage would increase energy usage.

Optimization of vehicle location may include keeping track of RX signal strengths and map related info (e.g., 3D location, orientation, and ordination) for the next time that the vehicle is in this location and actively setup the antennas usage. Further modifications can be made for differing types of weather to account for expected signal attenuation. Cloud-based mapping and/or internal AI's may be used to predict the optimal antenna usage and power levels. Antenna(s) that are not in use are preferably powered down to a low power state in which the antenna(s) only monitoring for receive power as input for the selection process. By way of example, a high mounted antenna location (e.g., rooftop mounted antenna such as a shark fin antenna, etc.) may be better for a rural environment, whereas a door or bumper mounted antenna location may be better for an urban environment. As the vehicle transitions between rural and urban environments, the system may be configured (e.g., algorithmically configured with an algorithm, etc.) to adjust to utilize the most appropriate antenna for the given environment.

In exemplary embodiments, the vehicular adaptive distributed antenna system or distributed antenna farm is configured to store and track the RX signal strength and use that information to adjust the antenna locations the next time the vehicle is at this location. Real time updates may also be used but it will take time to adjust the antennas. With the previous recorded data, the system may be configured to anticipate the adjustments and maintain the performance. Previous recorded data may be local to the vehicle, part of a high-definition map downloaded from the cloud, etc. Recorded signal strength may also be uploaded to support the high-definition maps.

With a SDR instance setup including 2TX and 4RX wherein all antenna locations are capable of TX, the vehicular adaptive distributed antenna system or distributed antenna farm system may be configured to dynamically select the best TX location(s). In other exemplary embodiments, the system may include more than 8 RX and 8 TX antenna locations, which may be four physical locations with cross polarized antennas in each location. In which case, 2 RX or TX antennas may be located in a same physical location in situations where a side of a vehicle has very little reception but the other side is in clear view of the base station and has better reception than other combinations. As can be appreciated, the benefits of such a configuration are enhanced for systems using frequencies that are essentially line of sight (such as mm wave frequencies). Antenna(s) not in use are preferably in a low power state only recording the RX power levels.

See, for example, FIGS. 12 through 15 illustrating examples in which a vDAS or distributed antenna farm has selected different antenna(s) with better lines of sight to the base stations as the vehicle travels and the situation changes including relative location of houses and a truck (FIG. 15) blocking direct lines of sight from some of the vehicle antennas to the base stations.

Figure 13:
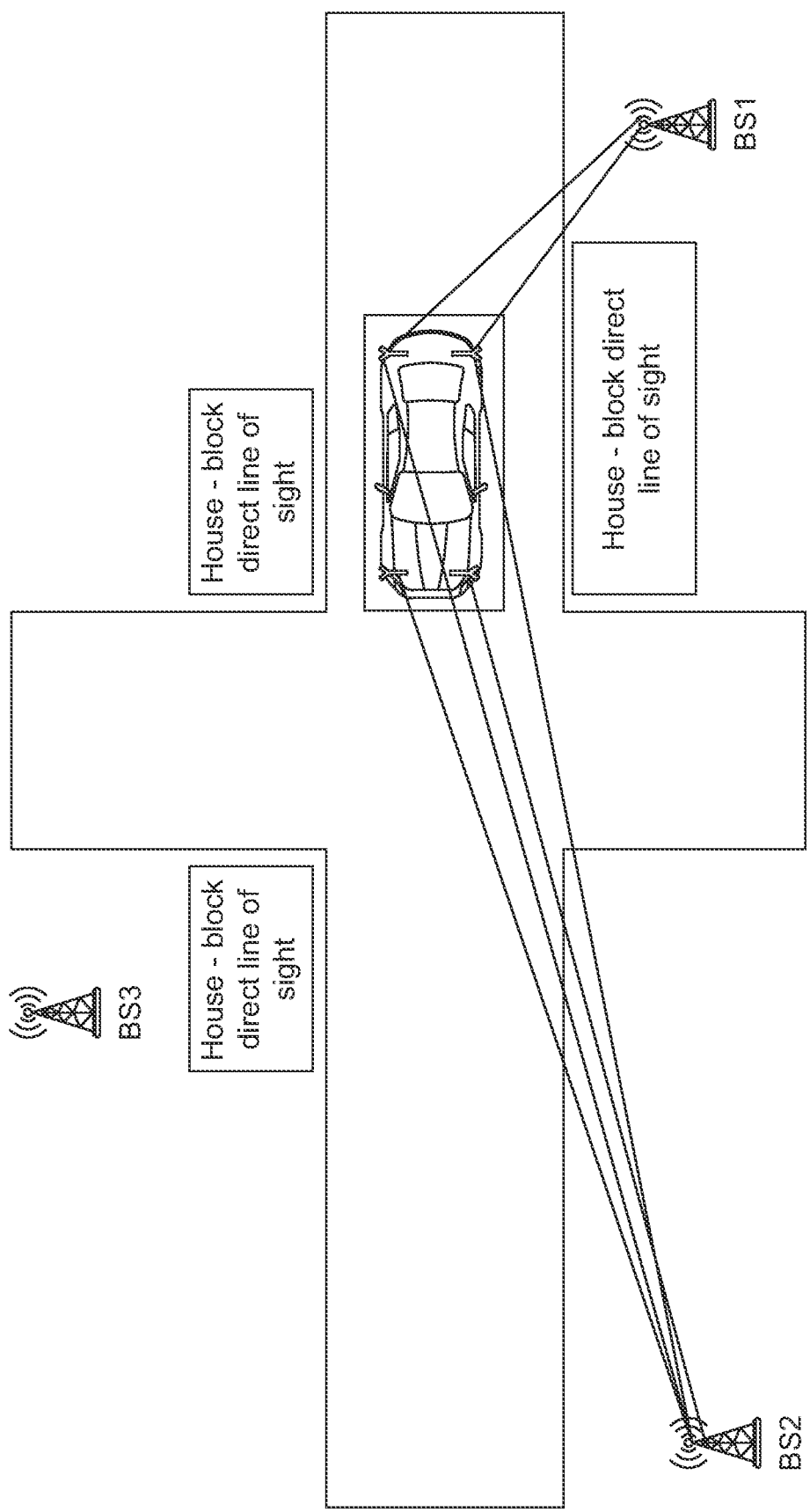

With reference to FIG. 13, a high definition (HD) map of base stations indicates that gain is better from BS2 for the four corner antennas onboard the vehicle. When the vehicle arrives in the intersection, the system switches from BS1 and the two rear corner cross polarized antennas. Although gain from BS2 is farther away, all four antennas can be seen by BS2 and have high gain on clear days. BS3 is closer to the antennas but BS3 cannot cover all four antennas due to the houses blocking direct line of sight to BS3.

Figure 14:
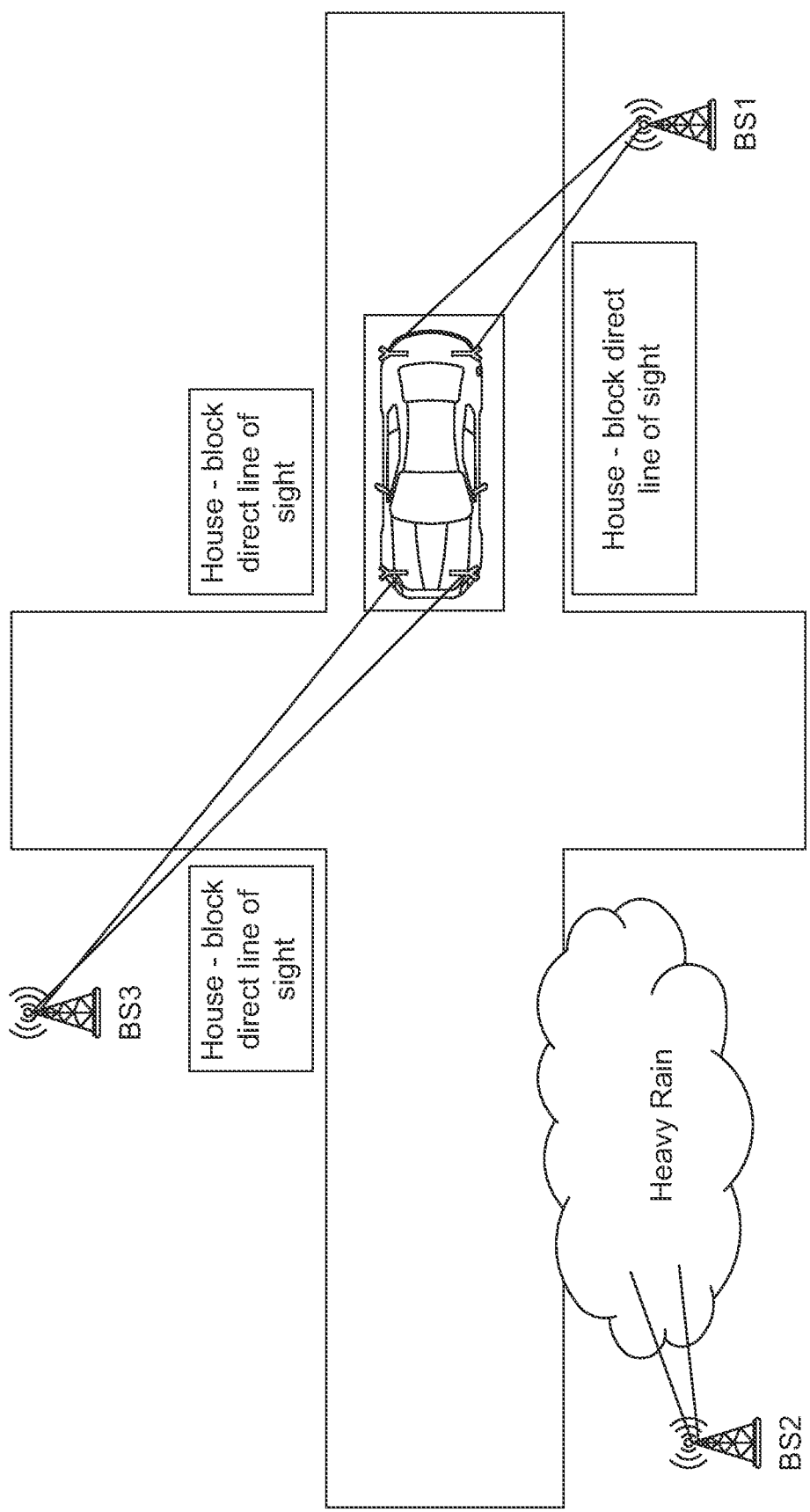

With reference to FIG. 14, a high definition (HI)) map of base stations and bad weather (e.g., via AI machine learning, etc.) indicates that gain is better from BS3 and two front corner cross polarized (4×4) antennas. When the vehicle arrives in the intersection, the system switches from BS1 and the two rear corner cross polarized antennas. Heavy rain is reducing gain from BS2, and BS3 has better throughput.

Figure 15:
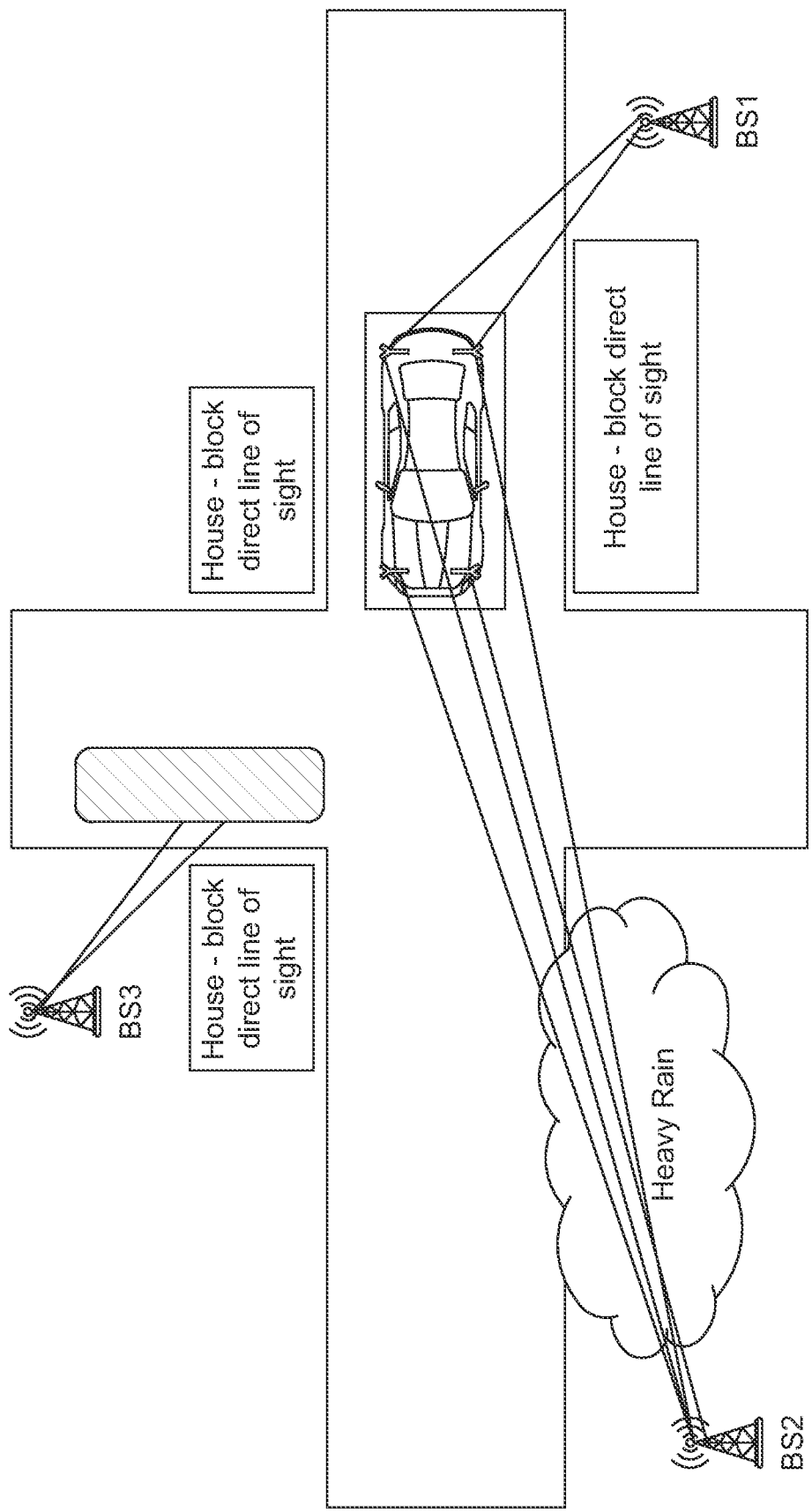

With reference to FIG. 15, a high definition (HD) map of base stations and bad weather and heavy traffic (e.g., via AI machine learning, etc.) indicates that gain is better from BS2 and four front corner cross polarized (4×4) antennas. When the vehicle amves in the intersection, the system switches from BS1 and the two rear corner cross polarized antennas. Gain from BS2 is better when heavy traffic due to trucks blocking signal from BS3, although the heavy rain normally attenuates the signal so that the BS2 has lower gain than BS3.

Regarding shared IQ data streams, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to allow one or more IQ data streams to be sent from an active antenna. For example, the IQ data streams may include a V2X data stream and a cellular data stream, which are each sent to the matching or corresponding SDR instance. As another example, the IQ data streams may include a first cellular data stream and a second cellular data stream, which are respectively sent to the matching or corresponding first SDR instance (SDR1) and second SDR instance (SDR2). As another example, the IQ data stream(s) may be sent (e.g., broadcast, etc.) to multiple SDR instances (e.g., data stream(s) broadcast to both SDR1 and SDR2, etc.). The routing of the data streams may be dynamically configured. See, for example, FIG. 4 illustrating the vehicular adaptive distributed antenna system or distributed antenna farm 100 wherein SDR Application Instances 1 and 2 are sharing IQ data streams (DL IQ Stream 1, 2, and DL IQ Stream 3, 4) from multiple remote antennas.

Accordingly, the system may be configured to allow sharing of antennas for multiple purposes, along with dynamically selecting which antenna is used for an SDR instance. The system may also be configured to optimize the usage of an antenna element by allowing it to be used for multiple functions like V2X and cellular communications reducing the need for a dedicated V2X antenna or doubling of antennas when there are two or more SDR instances (e.g., two modems in the vehicle, etc.).

In exemplary embodiments of the vehicular adaptive distributed antenna system or distributed antenna farm, the RF transceivers are configured to be operable to digitize and stream multiple carrier frequencies to multiple SDR instances. The transceiver can also transmit multiple streams, e.g., to one or more antenna elements, etc. If an active antenna has wide enough bandwidth to cover multiple carriers which different SDR instances may require, then multiple SDR instances are not necessarily required to be operating with the same carrier frequency.

Regarding GNSS sharing/location, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to increase accuracy when determining the positioning of a vehicle by utilizing existing antennas used for cellular and V2X and/or multiple antenna locations throughout the vehicle. This may allow for increased accuracy of the position reporting of the vehicle. While one satellite view (SV) may be blocked for a first antenna, the satellite may be visible to a second antenna or another satellite may be visible to the first antenna. This will improve performance such as in urban canyons and other locations at which satellite views may be obstructed or blocked from an antenna(s). With two or more antennas and high precision (HP) positioning, a heading information in the stationary scenario is achievable for vehicles. Using a vehicle distributed antenna system (vDAS) as a foundation will provide a cost-effective solution that enables distributed antennas for RF technologies (e.g., cellular, GNSS, Wi-Fi, Bluetooth (BT), Bluetooth Low Energy (BLE), etc.). WiFi/BT/BLE location or Ultra-Wideband (UWB) location services (e.g., for a smartphone as a key, etc.) may be combined with triangulation of the signal using the digital antennas, such as for determining location of a smartphone (e.g., at which door, within the vehicle, etc.).

In exemplary embodiments of the vehicular adaptive distributed antenna system or distributed antenna farm, the GNSS data processing is done via the central compute as a Software Defined Radio (SDR). The Radio is a software instance of a GNSS receiver. By using the antenna, a tuning into a GNSS signal at different locations on a vehicle can increase the locations by comparing the received signals from each antenna. The orientation of the vehicle can also be calculated without movement as the location of the vehicle antennas are known.

Regarding antenna element(s) time sharing, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to use dead time in a network time slice for other carriers or other applications, e.g., GNSS input bands, etc. The system may be configured with the ability to switch to other cell carriers to support hand over and/or to support a second instance of an SDR. Accordingly, the system may be configured to optimize or at least improve antenna usage in the time domain.

During a network schedule while the base station is transmitting to other user equipments (UEs) on the network, the system may be configured to switch the active antenna to scan for GNSS bands then switch back to the UE cellular band. The system may be configured to take advantage of existing time-division duplexing (TDD) schedules and frequency division duplexing, e.g., utilize this space for other SDR instances when not transmitting or expecting RX data, etc. For example, the system may be configured to be operable with TDD using different virtual NADs/SDRs (network access devices/software defined radios).

If two SDR instances are connected to a same base station, then the time slicing is known and synchronized by the base station. And in the case where it is a different carrier frequency and time domains, the system may be configured (e.g., algorithmically configured via an algorithm, etc.) to select the best time slicing to meet the timing requirements. Any discrepancies would be handled by prioritizing one SDR instance over the other and by dropping the communications for that time slice.

As recognized herein, GNSS data may transmitted recurringly but needs doppler shift info to lock to the correct carrier frequency. Accordingly, exemplary embodiments disclosed herein may be configured to be operable with GPS TDD.

With further regard for antenna element time sharing, Idle Time and Connected are two different states to consider. During Idle Time Connected but not active, there is a period of time (e.g., a second(s), etc.) for having to respond to a base station. For Connected active, the period of time (e.g., millisecond(s), etc.) will be shorter for responding to a base station.

In an Idle Scenario, the active antenna swaps between Listening to PDBCH at predefined internals and using the time in between for other operations like GNNS or another SDR instance in the Idle Mode. The antenna that is not active with one connection may be used as a resource for another connection.

In a Connected Active State, the system may be able to swap (e.g., at 1 millisecond (ms) or less, etc.) and listen to other frequency ranges (e.g., GNNS, etc.) during Idle frames. With GNSS, the system may be configured to build up the data stream over time by putting the info back together, which could also be from other antennas.

Regarding safety, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured such that there are redundant and failover communications channels based on SDR modems and distributed antennas. In which case, the system may be configured to provide an always connected system in case of a failure at a remote antenna or within an SDR of the central compute.

In exemplary embodiments of the vehicular adaptive distributed antenna system or distributed antenna farm, active antennas are distributed around the vehicle. The active antennas are connected via a digital link(s) to and monitored by one or more central compute nodes or units. When a failure occurs, one or more other antennas are used as a backup to keep the connection alive. Depending on the total number of antennas in the system and their locations, this allows the system performance to be sustained or reduced but not entirely disabled. Redundancy may also be achieved in the central compute by sharing the data stream for the antenna to a redundant backup central unit (CU) instance. The CU instance could be dormant until a failure is detected, or the CU instance could be a secondary instance of a SDR and be used for non-critical task(s) during normal operation. The CU may be configured to operate with full battery power and handle eCall and other critical situations depending on severity of a vehicle crash, e.g., to help ensure an eCall antenna is always available, etc.

Regarding eCALL/Stolen Vehicle Tracking (SVT) redundancy, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured (e.g., algorithmically configured via an algorithm, etc.) for automatic failover to dedicated modem (non SDR) when an SDR instance cannot be maintained, e.g., due to a vehicle crash event, disabled due to tampering (SVT scenario), etc. The system may be configured to use a low power dedicated modem and switch over operation including antenna and SIM information. Accordingly, the system may be configured to maintain seamless eCall communication in the event of a vehicle crash with the use of low power modems.

During normal operation, vehicle communications and non-safety related eCall messages are communicated through the SDR instance. SIM and Modem ID information is downloaded to the dedicated eCall Modem and stored in memory (e.g., volatile memory, etc.), which would not require the use of a secondary SIM module to support the eCall modem and the SDR instance. During the crash event, the eCall modem is configured to use the SIM information for call functionality. Also, during Normal operation, the eCall Modem is disconnected from the main antenna system and is used by an SDR instance.

As noted above, the system may be configured such that there are redundant and failover communications channels based on SDR modems and distributed antenna systems. In which case, the eCall may function within the SDR if the central compute can maintain power, and there is at least one active antenna available. If the vehicle is designed to maintain active operation of the vehicle central compute during a crash event, then a secondary modem may not be needed.

In exemplary embodiments, a specific eCall radio may be added to an active antenna for crash events. All other communications may go through the SDR and share the antennas in the distributed antenna farm or system, thereby providing redundancy in case there is a failure at a remote antenna or within an SDR of the central compute. The dedicated eCall Modem may then be initiated only for battery and crash specific cases.

In exemplary embodiments, a vehicular adaptive distributed antenna system or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.) may be configured to:

monitor and rank the incoming performance/power per antenna element;

monitor the traffic data rate from/to the SDR(s);

prioritize the traffic needs of SDR(s) versus available antennas;

assign antennas to particular SDR instance(s) per cellular network scan;

optionally request the network to allow x number of MIMO antennas to be used (e.g., per traffic requirements, etc.); and Next Cellular Network Scan repeat.

The process of assigning antennas to particular SDR instance(s) per cellular network may include assignment of dummy antenna streams to SDR instance(s) to match the setup. "Dummy" means that the power level would be effectively zero for RX as TX should be real.

The Next Cellular Network Scan repeat process may include the system synchronizing with the current active carrier. If there is more than one carrier, the system may setup synchronization instances per carrier.

Figure 16:
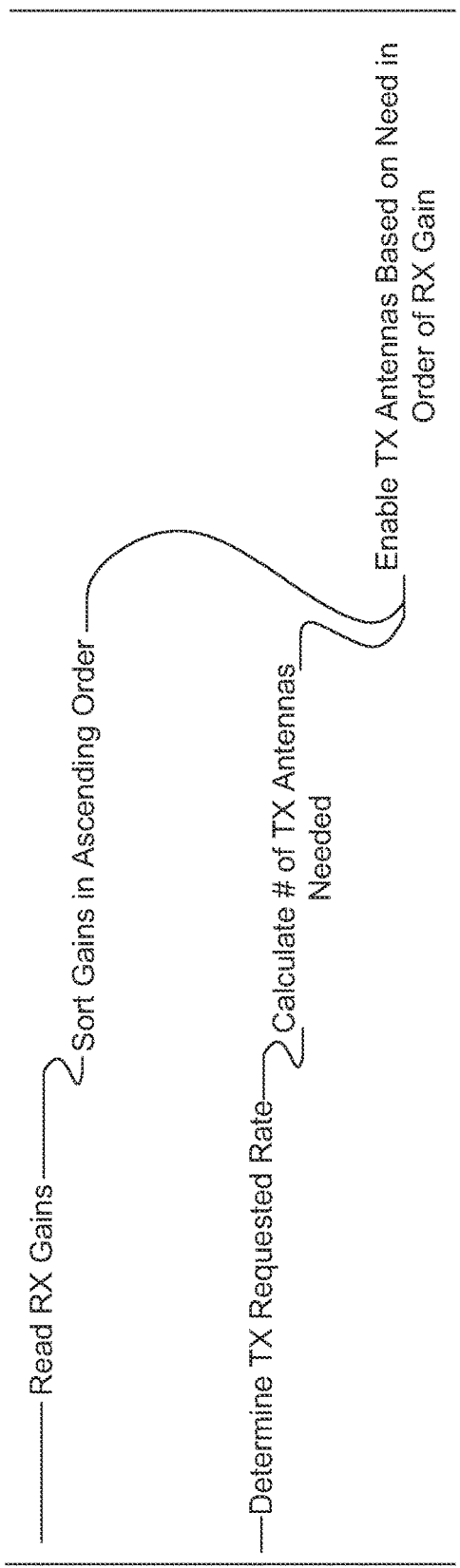
FIGS. 16 and 17 include diagrams representing an example adaptive transmission (TX) antenna selection process for power savings, which may be implemented in a vDAS or distributed antenna farm according to an exemplary embodiment of the present disclosure.
Figure 17:
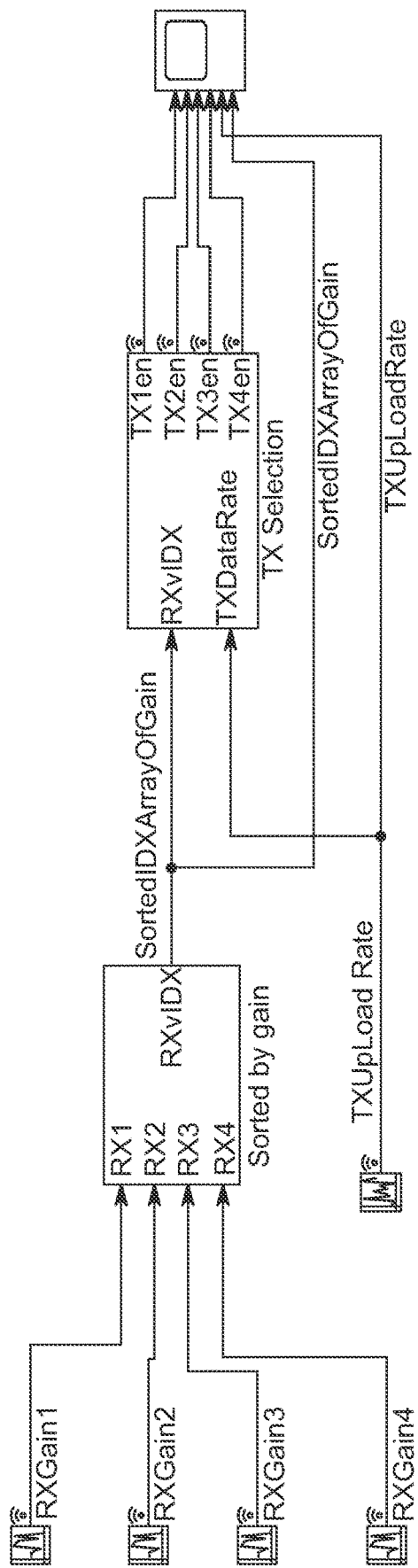

FIGS. 16 and 17 include diagrams representing an example adaptive transmission (TX) antenna selection process for power savings, which may be implemented in a vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.). As shown in FIG. 16, the process includes reading RX gains and sorting the gains in ascending order. The process also includes determining TX requested rate and calculating the number of TX antennas needed. The process then includes enabling the TX antennas based on need in order of RX gain. As disclosed herein, the TX antennas that are not enabled may be powered down or set to low power mode.

Figure 18:
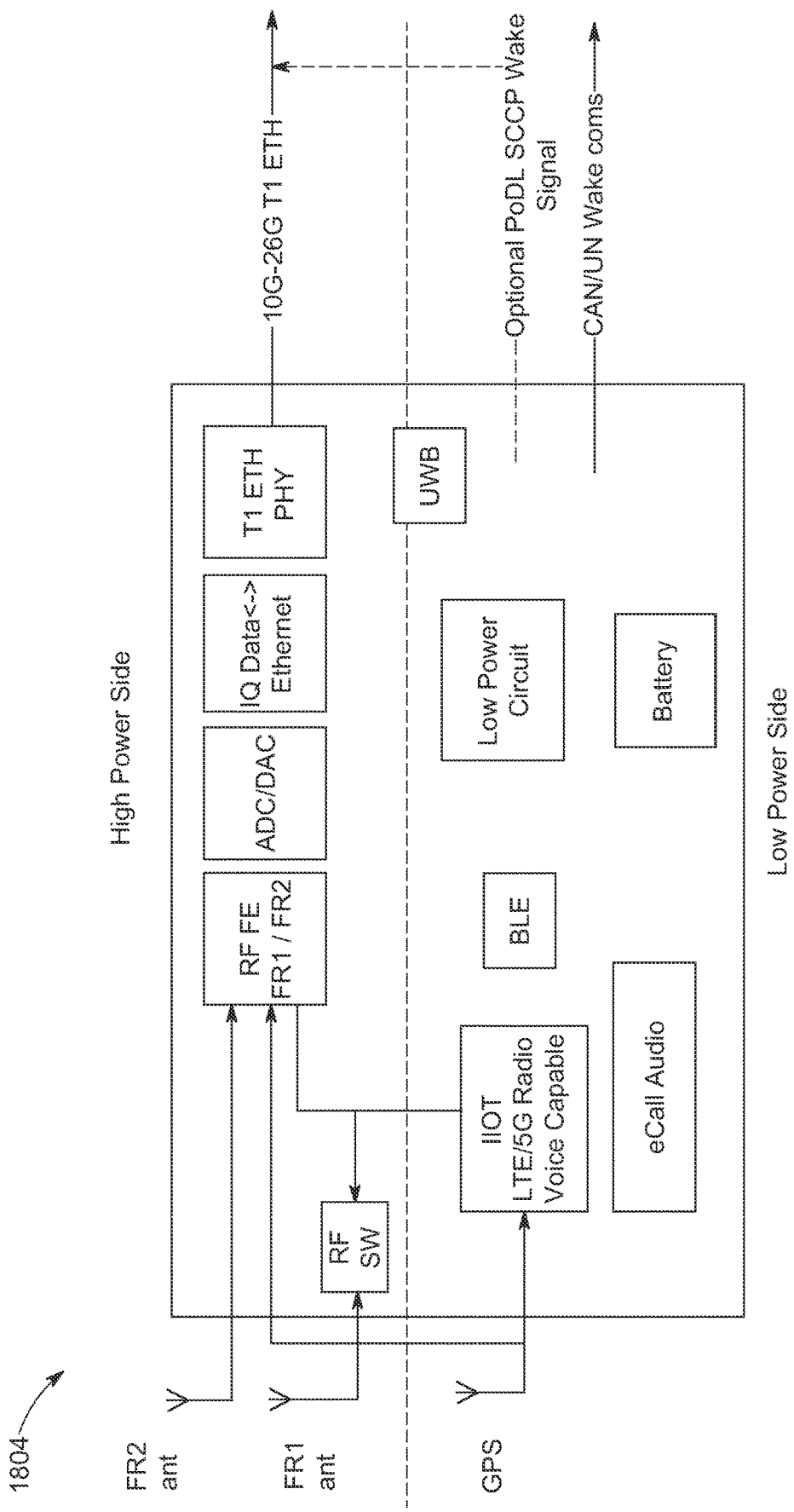
FIG. 18 is a block diagram of an active antenna including eCall, which may be used in a vDAS or distributed antenna farm according to an exemplary embodiment of the present disclosure.

FIG. 18 illustrates an active antenna 1804 including eCall, which may be used in a vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.). The antenna 1804 includes an FR1 antenna element, an FR2 antenna element, and a GPS antenna element. A high power side of the antenna 1804 includes a radio frequency switch (RF SW), an RF front end (FE) module, an analog to digital converter/digital to analog converter (ADC/DAC), IQ Data Framer/Deframer (e.g., IQ Data Compression/Decompression and Time Synchronization module, etc.), and a high speed digital link interface (e.g., 10 Gbps-Ethernet channel, 25 Gbps-Ethernet channel, or other desirable protocol for supporting suitable data rates). The RF front end module may include a power amplifier for transmission and a low-noise amplifier for reception. A low power side of the antenna 1804 is configured with or includes eCall Audio, IIOT LTE/5G Radio Voice Capable module, Bluetooth Low Energy (BLE), a low power circuit, a battery, and ultrawide band (UWB).

Figure 19:
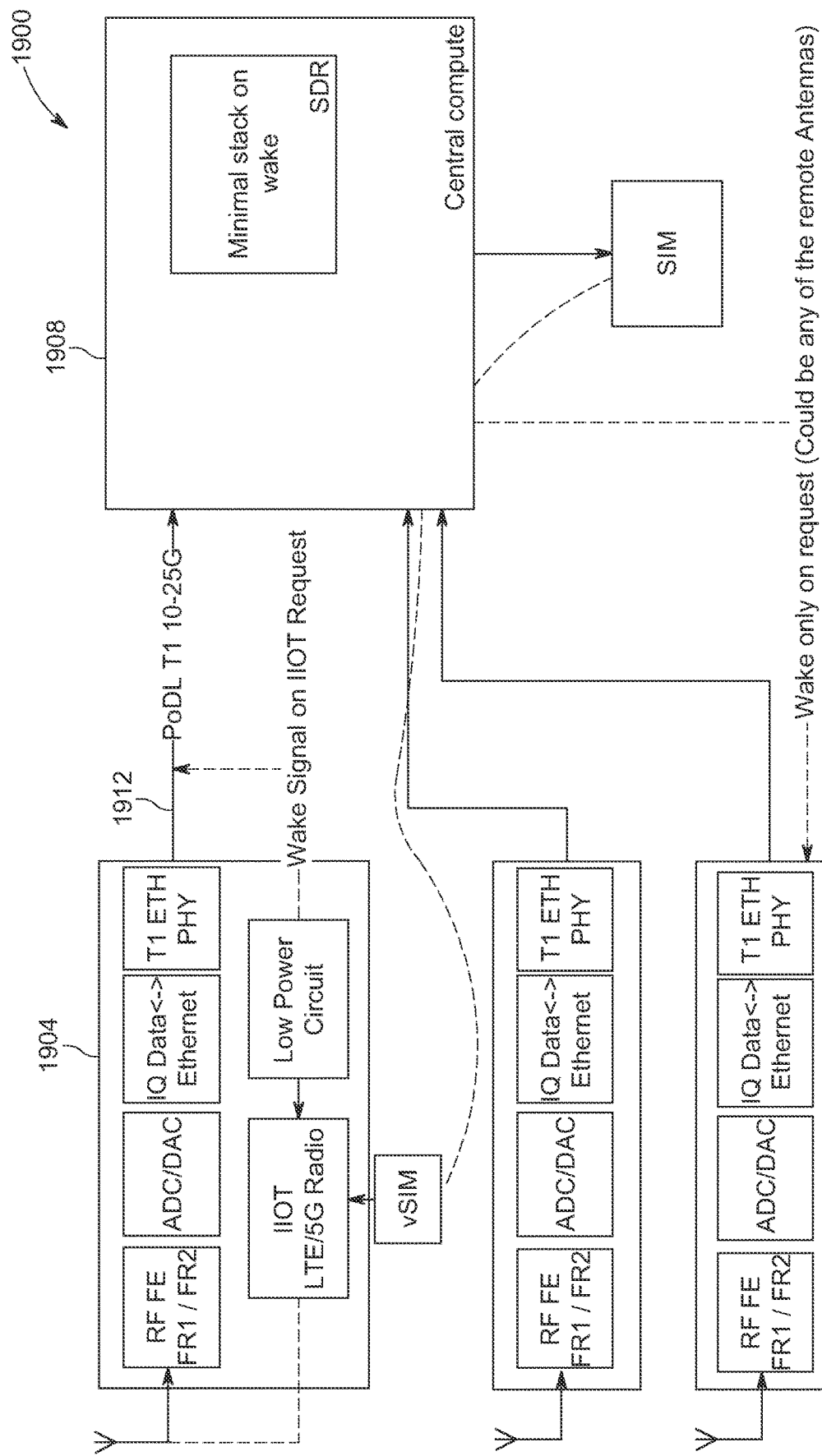
FIG. 19 is a block diagram illustrating a vDAS or distributed antenna farm operable in a low power mode according to an exemplary embodiment of the present disclosure.

FIG. 19 illustrates a vDAS or distributed antenna farm 1900 operable in a low power mode according to an exemplary embodiment of the present disclosure. The system 1900 includes multiple remote active antennas 1904 and a central compute node or central unit 1908 onboard a vehicle. The active antennas 1904 are in communication with the central compute node 1908 via links 1912.

In this example, the IIOT modem or IIOT LTE/5G radio may need to wake up the IQ Data to Ethernet to be able to send communications to the central compute 1908. Or the IIOT modem may use an In-Vehicle Network (IVN) (e.g., Local Interconnect Network (LIN), Controller Area Network (CAN), Ethernet, etc.) to send info to system to wake up. The IIOT radio may obtain SIM information from the central compute SDR before powering down and thereafter maintain or hold the SIM information (e.g., in a temporary virtual SIM, etc.) during low power state. Once the system wakes up, the SIM information is handed back to the SDR of the central compute 1908. The remote antennas 1904 are preferably all in deep sleep during parked or sleep state with the exception of the IIOT radio that wakes others as needed. For periodic wakeups, the system 1900 is preferably configured to record the best radio to be used in partial wake up scenarios, e.g., wake up the antenna with the best reception.

Figure 20A:
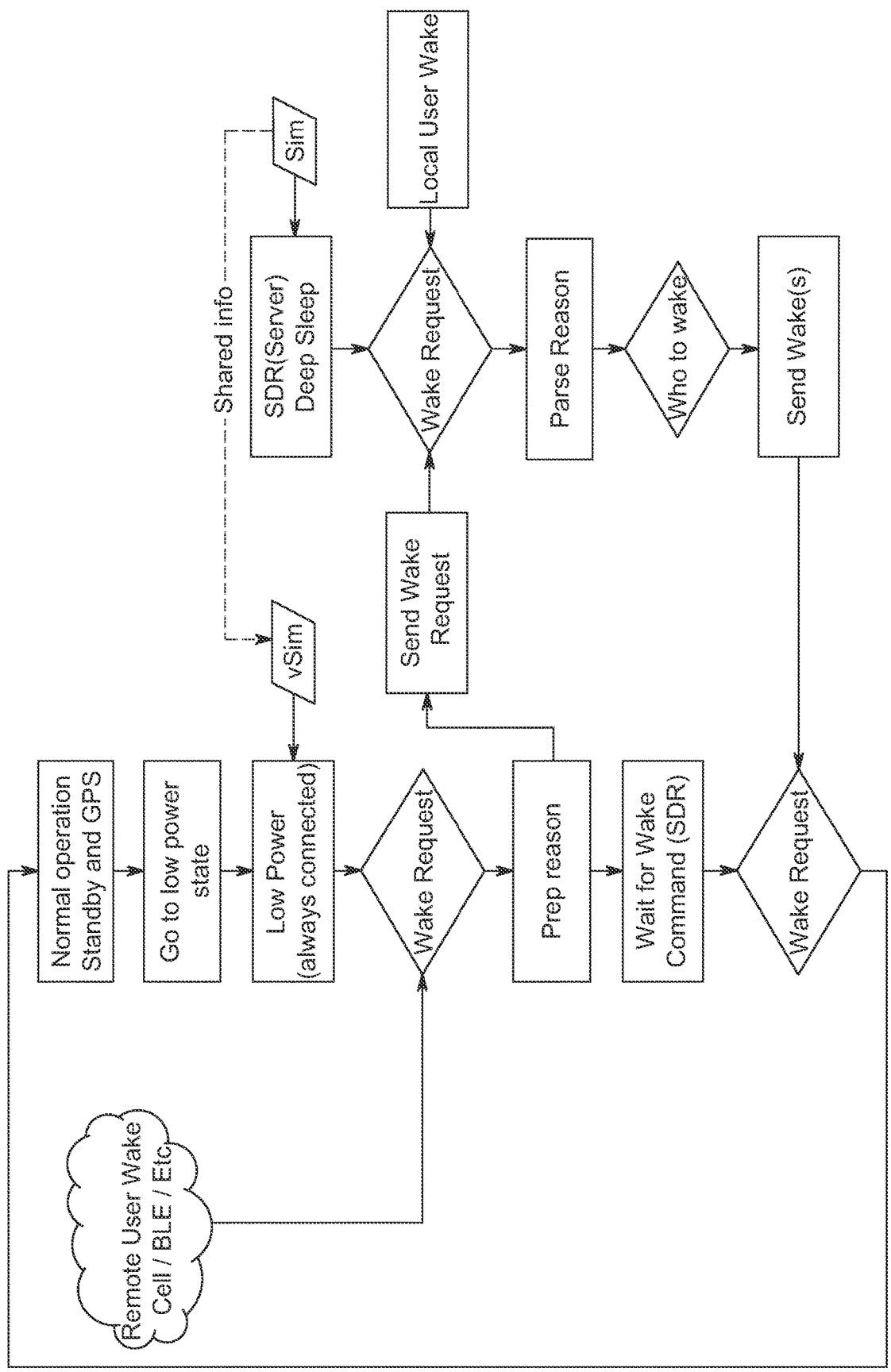
FIGS. 20A and 20B illustrate an example process of waking up from low power mode, which may be implemented in a vDAS or distributed antenna farm according to an exemplary embodiment of the present disclosure.
Figure 20B:
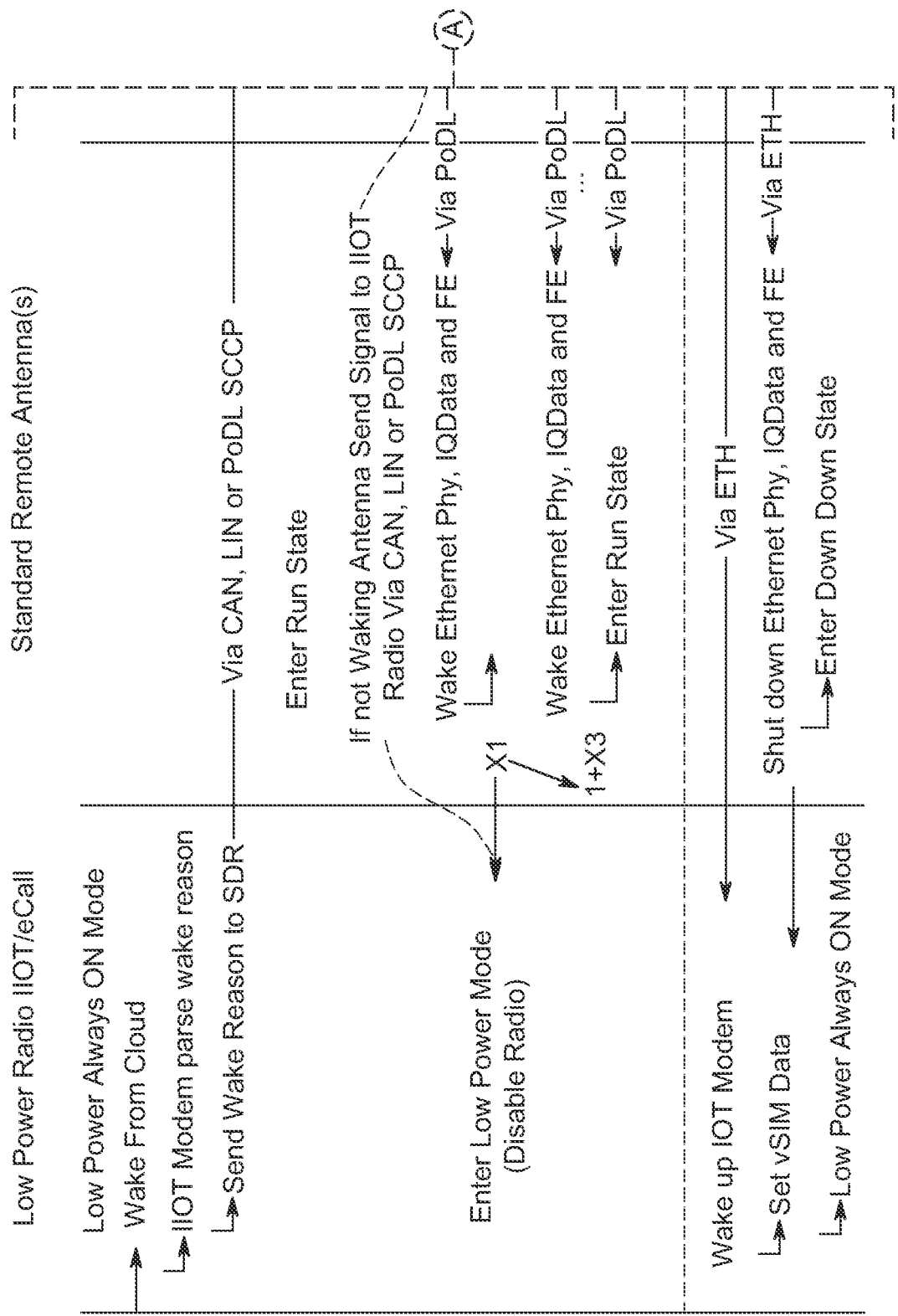
Figure 20B:
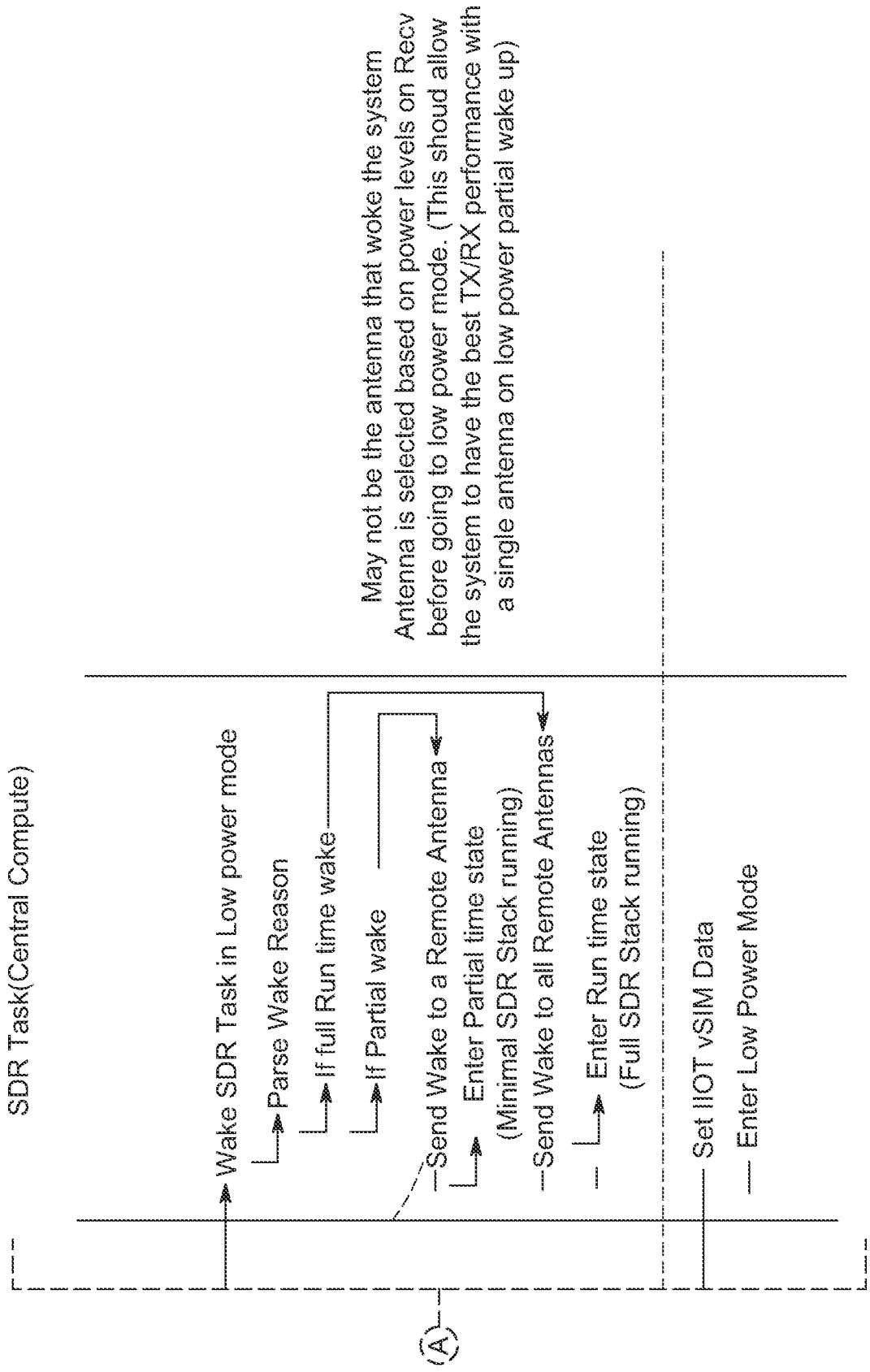

FIGS. 20A and 20B illustrate an example process of waking up from low power mode, which may be implemented in a vDAS or distributed antenna farm (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.).

Figure 21:
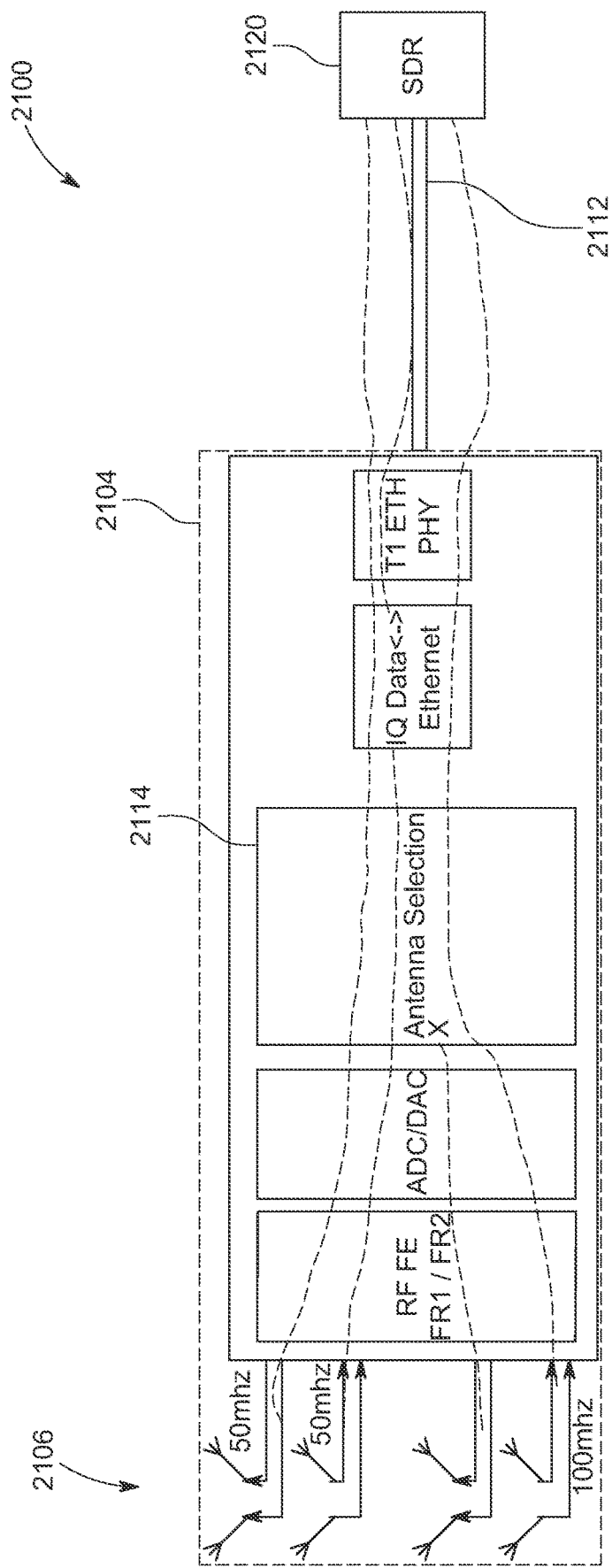
FIG. 21 is a block diagram of a system operable for selecting and combining IQ data streams from multiple local antennas into a single combined IQ data stream according to an exemplary embodiment of the present disclosure.

FIG. 21 illustrates a system 2100 operable for selecting and combining IQ data streams from multiple local antennas into a single combined IQ data stream according to an exemplary embodiment of the present disclosure. As shown, the system 2100 includes a remote active antenna 2104 and a software defined radio (SDR) instances 2120. The active antenna 2104 is remote from and in communication with the SDR instance 2120 via a digital link 2112.

In this example, the remote active antenna 2104 includes an antenna selection module 2114 and four local antennas 2106 in communication with the antenna's transceiver. The remote active antenna 2104 also includes an RF front end (FE) module, an analog to digital converter/digital to analog converter (ADC/DAC), IQ Data Framer/Deframer (e.g., IQ Data Compression/Decompression and Time Synchronization module, etc.), and a high speed digital link channel (e.g., 10 Gbps-Ethernet channel, 25 Gbps-Ethernet channel, or some other desirable channel with suitable bandwidth, etc.). The RF front end module may include a power amplifier for transmission and a low-noise amplifier for reception.

The antenna selection module 2114 is configured such that the remote active antenna 2104 has the ability to select one or more of the local antennas 2106 for transmission across the digital link 2112. In this example, the remote active antenna 2104 includes four local antennas 2106 in communication with the antenna's transceiver. But the IQ data stream may be able to only support two IQ data streams. In which case, the remote active antenna 2104 is then operable for selecting two of the four local antennas 2106 that provide the best fit/performance.

The selection process for the local antennas 2106 may be based on one or more of bandwidth supported by the digital link 2112, best antenna performance, or a combination thereof. In an example of the antenna selection process based on supported bandwidth, the digital link 2112 may be able to support a maximum 200 MHz of raw data. And the remote active antenna 2104 may select two local antennas 2106 each supporting 50 MHz and one local antenna 2106 supporting 100 MHz. This could be for two separate SDR instances, e.g., 2 out of 4 MIMO antennas for SDR 1 and 1 out of 4 MIMO antennas for SDR 2, etc.

In an example of the antenna selection process based on best antenna performance, the remote active antenna 2104 may select to use two local antennas 2106 from the four local antennas 2016 because the overall gain for the system 2100 is better than using antennas from other remote antenna locations.

A further example may include an antenna selection process based on a combination of the above supported bandwidth example and best antenna performance example. This combination may enable optimization or at least improvement of antenna usage between bandwidth requirements and digital link resources available. This may also be affected by the priority of the SDR instances. For example, a SDR used in a safety related application is prioritized to have a higher priority than an infotainment system SDR.

Figure 22:
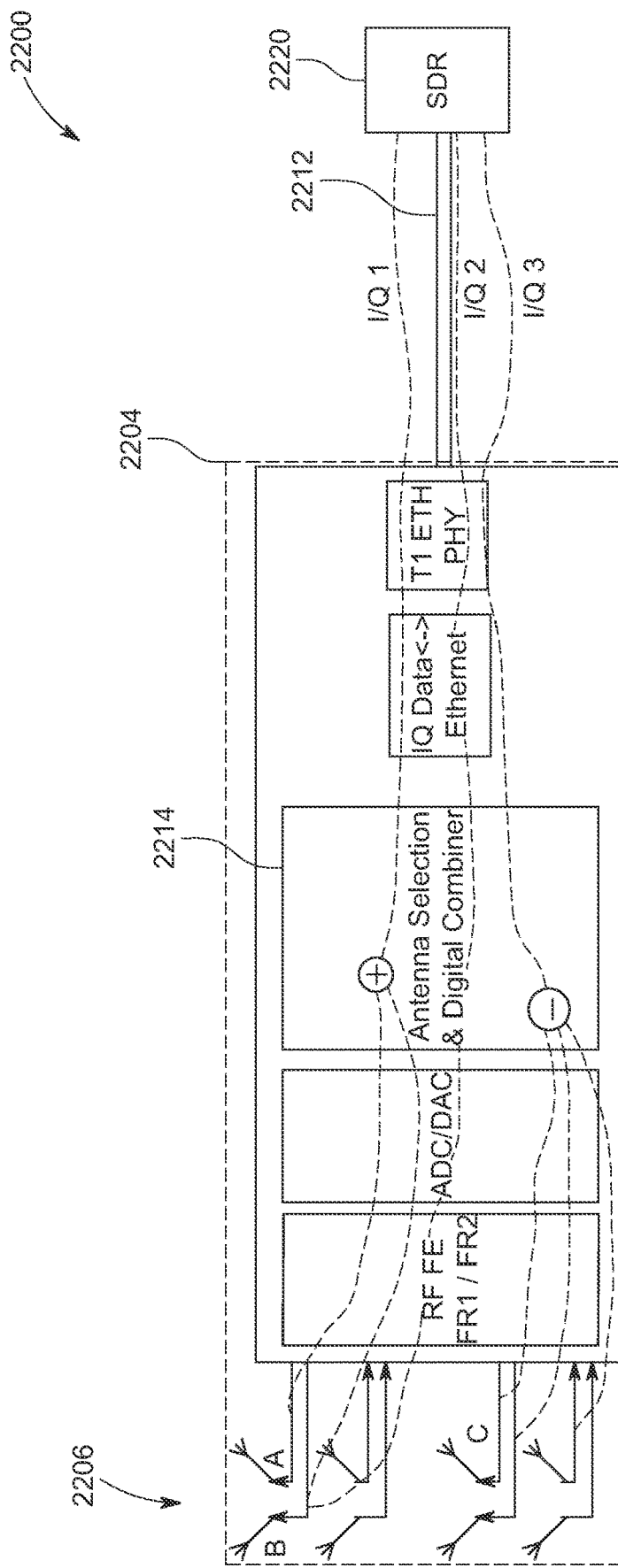
FIG. 22 is a block diagram of a system operable for combining local antenna sources into a single combined IQ data stream according to an exemplary embodiment of the present disclosure.

FIG. 22 illustrates a system 2200 operable for combining local antenna sources into a single combined IQ data stream according to an exemplary embodiment of the present disclosure. As shown, the system 2200 includes a remote active antenna 2204 and a software defined radio (SDR) instances 2220. The active antenna 2204 is remote from and in communication with the SDR instance 2220 via a digital link 2212.

In this example, the remote active antenna 2204 includes an antenna selection and digital combiner module 2214 and four local antennas 2206 in communication with the antenna's transceiver. The remote active antenna 2204 also includes an RF front end (FE) module, an analog to digital converter/digital to analog converter (ADC/DAC), IQ Data Framer/Deframer (e.g., IQ Data Compression/Decompression and Time Synchronization module, etc.), and a high speed digital link channel (e.g., 10 Gbps-Ethernet channel, 25 Gbps-Ethernet channel, or some other desirable channel with suitable bandwidth, etc.). The RF front end module may include a power amplifier for transmission and a low-noise amplifier for reception.

The antenna selection and digital combiner module 2214 is configured such that the remote active antenna 2204 is operable for digitally combining IQ data streams from two or more local antennas 2206 into one digital IQ data stream, which is thereafter routable to and usable by a baseband processor or SDR instance of the system 2200. For example, the system 2200 may digitally combine two ADC inputs before sending to the baseband processor or SDR instance (in time domain).

The system 2200 may be configured to be operable for using the two or more local antennas 2206 in the same remote antenna location to cancel out noise and/or for using other local antenna feed(s) to reduce noise interference (e.g., using a cross polarized version).

The system 2200 may be configured to be operable for determining whether the IQ data streams from the two or more local antennas 2206 should be combined based on multiple input multiple output (MIMO) needs. When the system 2200 determines that the IQ data streams from the two or more local antennas 2206 should be combined based on multiple input multiple output (MIMO) needs, the system 2200 is operable for digitally combining IQ data streams from the two or more local antennas 2206 into a combined single digital IQ data stream.

With continued reference to FIG. 22, the I/Q 1 Data Stream is a combination from A and B antennas. This combined I/Q 1 Data Stream is treated by the system 2200 as being from one antenna by the SDR instance 2220. The IQ 2 Data Stream from antenna B is treated independently by the system 2200. And the I/Q 3 Data Stream from antenna C is also treated independently by the system 2200 but noise is cleaned up by using other antenna feeds.

In exemplary embodiments, active digital link power management may be implemented in a system disclosed herein (e.g., system 100 (FIG. 1), system 500 (FIG. 5), system 600 (FIG. 6), system 700 (FIG. 7), system 900 (FIG. 9), system 1900 (FIG. 19), system 2100 (FIG. 21), system 2200 (FIG. 22), etc.). In such exemplary embodiments, the system is configured to be operable with active digital link power management such that only signal strength(s) relevant for a receiver is allowed to be transmitted over a digital link(s) of the system.

When a remote antenna is the receiver, the system may be configured such that an IQ Data stream is only sent to the remote antenna when there is a RF signal, e.g., "zeros" are not sent. In this example, the antenna side will fill in the missing data with effectively "zero" data until a new sample from the baseband processor or SDR instance arrives.

When a central unit (e.g., baseband (BB) SDR) is the receiver, the system may be configured such that an IQ data stream is only sent from an antenna(s) to the central unit when the signal level is greater than a determined threshold. Otherwise, the baseband (BB) processor side will assume that the signal level is effectively "zero" and feed zeros into the baseband algorithms. Also, the system may be configured to be operable for establishing a receive window such that IQ data streams are only sent from an antenna(s) to the central unit when the antenna's transmitter is expected to be transmitting to a receiver of the central unit. This can be based on slot timing of the cellular network, which bands are active, listening for other towers, etc.

Energy savings may be realized with active digital link power management, e.g., save energy by not transmitting on Ethernet Frames 100% of the time. For example, Ethernet Frames are not sent, which is contrary to systems that send heartbeat Ethernet Frames to signal there is no data. If a frame is not received within a given time window, it is then assumed that that its IQ stream will be effectively zero (energy).

In exemplary embodiments, a system is operable for controlling and managing operation of an array of antennas distributed throughout a vehicle. The system includes multiple software defined radio instances configured for communication with the antennas. The system is configured such that the antennas are sharable with the multiple software defined radio instances.

In exemplary embodiments, the system is configured to be operable for selecting which IQ data streams from the array of antennas are routed to which software defined radio instances based on a priority of the multiple software defined radio instances.

In exemplary embodiments, the system is configured to be operable for reducing power of antenna(s) not being used within the array of antennas.

In exemplary embodiments, the system is configured to be operable for: actively selecting one or more antenna(s) within the array of antennas based on a bandwidth requirement(s) of user equipment with the vehicle; and reducing power to antenna(s) within the array of antennas that are not in use, that are not needed to satisfy the bandwidth requirement(s), and/or that have low power levels with effectively zero signal.

In exemplary embodiments, the system is configured to be operable for: actively selecting one or more antenna(s) within the array of antennas based on receive power for a location and orientation in three-dimensional space of the vehicle; and reducing power to antenna(s) within the array of antennas that have a lower receive power than the actively selected one or more antennas.

In exemplary embodiments, the system is configured such that the multiple software defined radio instances are operable for sharing IQ data streams from the array of antennas.

In exemplary embodiments, the system is configured such that the multiple software defined radio instances are operable for sharing IQ data streams from the array of antennas by using dead time in a network time slice for other carriers and/or other applications. And the system is configured with the ability to switch to other carriers to support hand over and/or to support a second instance of a software defined radio, whereby antenna usage in the time domain may be optimized or improved.

In exemplary embodiments, the multiple software defined radio instances include at least a first software defined radio instance and a second software defined radio instance. The first software defined radio instance is configured for an original equipment manufacturer. The second software defined radio instance is configured for user equipment. The system may also include more than two instances of a software defined radio, which may not necessarily have the same functionality, such as cellular, RF related functionality radar (e.g., positioning/object detection, etc.), Wi-Fi, etc.

In exemplary embodiments, at least one software defined radio instance of the multiple software defined radio instances is configured to be operable for sharing subscriber identification module (SIM) information with user equipment.

In exemplary embodiments, at least two software defined radio instances of the multiple software defined radio instances share a same subscriber identification module (SIM) thereby enabling an increased data rate.

In exemplary embodiments, the system includes a router layer before the multiple software defined radio instances. The router layer is configured to be operable for allowing the system to dynamically select better performing antenna(s) within the array of antennas for a current situation. The router layer may be configured to be operable for allowing the system to dynamically select the better performing antenna(s) within the array of antennas depending on one or more of downlink/uplink requirement(s) and/or gain per antenna. The system may be configured to be operable for reducing power of lower performing antenna(s) within the array of antennas that were not selected for the current situation. And the router layer may be configured to be operable for allowing the system to dynamically select the better performing antenna(s) within the array of antennas that has a high reliability communication and/or power and performance optimization depending on a current vehicle location, a rural location versus an urban location, a shadowing effect(s) of the vehicle itself, and/or a shadowing effect(s) of a nearby obstruction(s).

In exemplary embodiments, the system is configured such that the multiple software defined radio instances are operable for sharing IQ data streams from the array of antennas.

In exemplary embodiments, the multiple software defined radio instances include at least first and second software defined radio instances. The system is configured such that the first and second software defined radio instances are operable for respectively receiving first and second IQ data streams for respective first and second different carrier frequencies from a single antenna source.

In exemplary embodiments, the system includes a modem software stack that includes one or more of the multiple software defined radio instances.

In exemplary embodiments, a system is operable for controlling and managing operation of an array of antennas distributed throughout a vehicle. The system includes multiple software defined radio instances configured for communication with the antennas. The system is configured to be operable for selecting which IQ data streams from the array of antennas are routed to which software defined radio instances based on a priority of the multiple software defined radio instances.

In exemplary embodiments, the system is configured to be operable for selectively prioritizing and routing IQ data streams from the array of antennas to the software defined radio instances based on a prioritized ranking of the multiple software defined radio instances.

In exemplary embodiments, the system is configured such that IQ data streams from an antenna(s) within the array of antennas that is at an optimal location for a current situation are routed to a highest priority software defined radio instance.

In exemplary embodiments, the system is configured to be operable for routing IQ data streams to a highest priority software defined radio instance that are from an antenna(s) within the array of antennas that has a high reliability communication and/or power and performance optimization depending on a current vehicle location, a rural location versus an urban location, a shadowing effect(s) of the vehicle itself, and/or a shadowing effect(s) of a nearby obstruction(s).

In exemplary embodiments, the system is configured to be operable for monitoring receive data strength at antenna locations of the array of antennas and using the monitored receive data strength to optimize the best antenna location for a highest priority software defined radio instance, such that the highest priority software defined radio instance will receive IQ data streams from the antenna that is at the best antenna location.

In exemplary embodiments, the system is configured to be operable for using required transmit/upload data rates to thereby allow a lower priority software defined radio instance to utilize an antenna location that is more optimal than an antenna location for a higher priority software defined radio instance when the higher priority software defined radio instance requires low data rates.

In exemplary embodiments, a system is operable for controlling and managing operation of an array of antennas distributed throughout a vehicle. The system includes multiple software defined radio instances configured for communication with the antennas. The system is configured to be operable for reducing power of antenna(s) not being used within the array of antennas.

In exemplary embodiments, the system is configured to be operable for reducing power of antenna(s) within the array of antennas that do not have a signal level to support radio functionality and/or are not needed to satisfy a bandwidth requirement(s) and/or a better performing antenna(s) is available or in use.

In exemplary embodiments, the system is configured to be operable for reducing power of antenna(s) not being used within the array of antennas by: disabling a transmitter of the antenna(s) in a low power state; and/or powering down circuits of the antenna(s) except for a receiver level circuit(s), whereby a receiver side of a digital link of the antenna(s) may remain active to allow for adjustment(s) to active band(s), for monitoring power levels, and/or for waking up to respond to a request before returning to a low power state.

In exemplary embodiments, the system is configured to be operable with active digital link power management such that only signal strength(s) relevant for a receiver are allowed to be transmitted over a digital link(s) of the system.

In exemplary embodiments, the system includes a central unit that includes the multiple software defined radio instances. The system is configured to be operable for: only sending an IQ data stream from the central unit to an antenna(s) when there is a radio frequency (RF) signal; only sending an IQ Data stream from an antenna(s) to the central unit when the signal level is greater than a determined threshold; and establishing a receive window such that an antenna(s) only sends an IQ data stream to the central unit when the antenna's transmitter is expected to be transmitting to a receiver of the central unit.

In exemplary embodiments, power measurement is defined by pure radio frequency (RF) power in a frequency band and a signal to noise ratio (SNR) of the frequency band. And the system is configured to be operable for reducing power of antenna(s) having a signal to noise ratio that is too low such that the signal is not useable.

In exemplary embodiments, a system is operable for controlling and managing operation of an array of antennas distributed throughout a vehicle. The system includes multiple software defined radio instances configured for communication with the antennas. The system is configured to be operable for: actively selecting one or more antenna(s) within the array of antennas based on a bandwidth requirement(s) of user equipment with the vehicle; and reducing power to antenna(s) within the array of antennas that are not in use, that are not needed to satisfy the bandwidth requirement(s), and/or that have low power levels with effectively zero signal.

In exemplary embodiments, the system includes a central unit that includes the multiple software defined radio instances. The system is operable for deactivating antennas within the array of antennas algorithmically based on throughput, whereupon the multiple software defined radio instances are allowed to believe there are less antennas and/or the system provides a NULL data stream and the central unit maintains a link to any deactivated antennas.

In exemplary embodiments, a system is operable for controlling and managing operation of an array of antennas distributed throughout a vehicle. The system includes multiple software defined radio instances configured for communication with the antennas. The system is configured to be operable for: actively selecting one or more antenna(s) within the array of antennas based on receive power for a location and orientation in three-dimensional space of the vehicle; and reducing power to antenna(s) within the array of antennas that have a lower receive power than the actively selected one or more antennas.

In exemplary embodiments, the system is configured such that the active selection of the one or more antenna(s) within the array of antennas is based on one or more of: previously learned signal strengths for the location and orientation in three-dimensional space of the vehicle; high definitions maps of signal strength for the location and orientation in three-dimensional space of the vehicle; and/or artificial intelligence (AI) machine learning of routes taken by the vehicle and best antenna locations.

In exemplary embodiments, the system is configured to track and store antenna receiver signal strengths for the location and orientation of the vehicle for later use by the system to actively set up the array of antennas when the vehicle is in the same location and orientation.

In exemplary embodiments, the system is configured to utilize cloud-based mapping and/or internal artificial intelligence (AI) to predict optimal antenna usage for the array of antennas.

In exemplary embodiments, the system is configured such that the active selection of the one or more antenna(s) within the array of antennas enables optimization of the system to have better antenna performance and reduced energy usage.

In exemplary embodiments, a system is operable for controlling and managing operation of an array of antennas distributed throughout a vehicle. The system includes multiple software defined radio instances configured for communication with the antennas. The system is configured such that the multiple software defined radio instances are operable for sharing IQ data streams from the array of antennas.

In exemplary embodiments, the multiple software defined radio instances include first and second software defined radio instances. And the system is configured such that the first and second software defined radio instances are operable for respectively receiving first and second IQ data streams for respective first and second different carrier frequencies from a single antenna source.

In exemplary embodiments, the system is configured to be operable for dynamically selecting which antennas within the array of antennas are used for which software defined radio instances.

In exemplary embodiments, a system is operable for controlling and managing operation of an array of antennas distributed throughout a vehicle. The system includes a baseband processor or SDR instance configured for communication with the antennas. The system is configured to be operable for digitally combining IQ data streams from two or more antennas within the array of antennas into a combined digital IQ data stream and thereafter routing the combined digital IQ data stream to the baseband processor or SDR instance.

In exemplary embodiments, the system includes a remote antenna location at which the IQ data streams from the two or more antennas within the array of antennas are digitally combined into the combined digital IQ data stream. And the system is configured to be operable for using the two or more antennas in the same remote antenna location to cancel out noise and/or for using other local antenna feed(s) to reduce noise interference.

In exemplary embodiments, the system is configured to be operable for: determining whether the IQ data streams from the two or more antennas within the array of antennas should be combined based on multiple input multiple output (MIMO) needs; and digitally combining IQ data streams from the two or more antennas within the array of antennas into the combined digital IQ data stream when the system determines that the IQ data streams from the two or more antennas within the array of antennas should be combined based on multiple input multiple output (MIMO) needs.

In exemplary embodiments, a system is configured to provide increased vehicle location accuracy of a vehicle that includes an array of antennas distributed throughout the vehicle. The system includes a central unit configured for communication with the antennas. The system is configured to be operable for using signals from the array of antennas at different antenna locations throughout the vehicle for increased accuracy when determining the positioning of the vehicle.

In exemplary embodiments, the system configured to be operable for combining, with triangulation, signals from the array of antennas and location of user equipment relative to the vehicle with triangulation for increased accuracy when determining the positioning of the vehicle.

In exemplary embodiments, the central unit is configured to be operable as a software defined radio instance of a GNSS (Global Navigation Satellite System) receiver for processing GNNS data from the array of antennas. And the system is configured to be operable for comparing GNSS signals from the army of antennas at different antenna locations throughout the vehicle for increasing vehicle location data and for determining orientation of the vehicle as the different antenna locations throughout the vehicle are known.

In exemplary embodiments, a system is operable for controlling and managing operation of an array of antennas distributed throughout a vehicle. The system includes multiple software defined radio instances configured for communication with the antennas. The system is configured such that the multiple software defined radio instances are operable for sharing IQ data streams from the array of antennas by using dead time in a network time slice for other carriers and/or other applications. And the system is configured with the ability to switch to other carriers to support hand over and/or to support a second instance of a software defined radio, whereby antenna usage in the time domain may be optimized or improved.

In exemplary embodiments, the system is configured to switch an active antenna to scan for GNSS bands during a network schedule while a base station is transmitting to other user equipments (UEs) on the network, and then switch back to a user equipment cellular band.

In exemplary embodiments, the system is configured to use existing time-division duplexing (TDD) schedules and frequency division duplexing (FDD), including utilizing the space for other software defined radio instances when not transmitting or expecting receiver data. The system may be configured to be operable with time-division duplexing (TDD) using different virtual network access devices/software defined radios.

In exemplary embodiments, the system is configured such that when two software defined radio instances are connected to a same base station, then the time slicing is known and synchronized by the base station. And where it is a different carrier frequency and time domains, the system is configured to select a best time slicing to meet timing requirements with any discrepancies being handled by prioritizing one software defined radio instance over the other software defined radio instance and by dropping the communications for the time slice.

In exemplary embodiments, a system includes an array of antennas distributed throughout a vehicle, and one or more central units onboard the vehicle and including the multiple software defined radio instances. A link connects each antenna to at least one of the one or more central units. The links are configured to transmit signals digitally thereby enabling the antennas to communicate with and be monitored by the one or more central units. The system is configured to have redundancy and failover communications channels provided by the multiple software defined radio instances and the array of antennas.

In exemplary embodiments, the system is configured to provide an always connected system when an antenna failure or a software defined radio instance failure occurs by using one or more other antennas of the array of antennas as a backup to maintain the connection despite the antenna failure or a software defined radio instance failure.

In exemplary embodiments, the system is configured to provide redundancy in the one or more central unit by sharing the IQ data stream for a failed antenna to a redundant backup central unit instance that is dormant until a failure is detected or that is a secondary instance of a software defined radio used for non-critical task(s) during normal operation.

In exemplary embodiments, a system includes an array of antennas distributed throughout a vehicle; a software defined radio instance onboard the vehicle and in communication with the array of antennas; and a dedicated eCall modem onboard the vehicle. The system is configured to: communicate vehicle communications and non-safety related eCall messages through the software defined radio instance during normal operation; and automatically failover to the dedicated eCall modem when the software defined radio instance cannot be maintained or is disable, thereby maintaining seamless eCall communication. The dedicated eCall modem may include subscriber identification module (SIM) information downloaded to and stored within memory for call functionality.

In exemplary embodiments, a vehicular distributed antenna system includes a system as disclosed herein. The vehicular distributed antenna system includes a central unit onboard the vehicle that includes the multiple software defined radio instances. The array of antennas includes multiple remote active antennas distributed throughout the vehicle. A link connects each of the multiple remote active antennas to the central unit. The links are configured to transmit signals digitally thereby enabling the multiple remote active antennas to communicate with the central unit digitally and enabling the multiple remote active antennas to be sharable with the multiple software defined radio instances of the central unit. The central unit may be configured to be sharable with other vehicle functions or dedicated to hosting the multiple software defined radio instances.

Also disclosed are exemplary methods relating to (e.g., controlling and managing operation of, etc.) an array of antennas distributed throughout a vehicle. In exemplary embodiments, a method includes: sharing the antennas with multiple software defined radio instances onboard the vehicle; and/or selecting which IQ data streams from the array of antennas are routed to which software defined radio instances based on a priority of the multiple software defined radio instances.

In exemplary embodiments, a method includes reducing power of antenna(s) not being used within the array of antennas.

In exemplary embodiments, a method includes actively selecting one or more antenna(s) within the array of antennas based on a bandwidth requirement(s) of user equipment with the vehicle; and reducing power to antenna(s) within the array of antennas that are not in use, that are not needed to satisfy the bandwidth requirement(s), and/or that have low power levels with effectively zero signal.

In exemplary embodiments, a method includes actively selecting one or more antenna(s) within the array of antennas based on receive power for a location and orientation in three-dimensional space of the vehicle; and reducing power to antenna(s) within the array of antennas that have a lower receive power than the actively selected one or more antennas.

In exemplary embodiments, a method includes sharing IQ data streams from the array of antennas with the multiple software defined radio instances.

In exemplary embodiments, a method includes sharing IQ data streams from the array of antennas with the multiple software defined radio instances by using dead time in a network time slice for other carriers and/or other applications. The method also includes switching to other carriers to support hand over and/or to support a second instance of a software defined radio, whereby antenna usage in the time domain may be optimized or improved.

In exemplary embodiments, a method includes digitally combining IQ data streams from two or more antennas within the array of antennas into a combined digital IQ data stream and thereafter routing the combined digital IQ data stream to a baseband processor or SDR instance.

In exemplary embodiments, a method includes providing redundancy and failover communications channels using the multiple software defined radio instances and the array of antennas.

In exemplary embodiments, a method includes using signals from the array of antennas at different antenna locations throughout the vehicle for increased accuracy when determining the positioning of the vehicle.

In exemplary embodiments, a method includes communicating vehicle communications and non-safety related eCall messages through a software defined radio instance during normal operation; and automatically failing over to a dedicated eCall modem to maintain seamless eCall communication if the software defined radio instance cannot be maintained or is disabled.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A computing system for controlling and managing operation of a plurality of antennas distributed in a vehicle, the computing system comprising multiple software defined radio instances configured for communication with the plurality of antennas, wherein:
   the computing system is configured such that the plurality of antennas are connected with the multiple software defined radio instances; and
   the computing system is configured to be operable for selecting one or more in-phase quadrature (IQ) data streams to be routed from the plurality of antennas to at least one of the multiple software defined radio instances based on a priority of each of the multiple software defined radio instances, wherein at least two software defined radio instances of the multiple software defined radio instances share a same subscriber identification module (SIM) thereby enabling an increased data rate.

2. The computing system of claim 1, wherein at least one software defined radio instance of the multiple software defined radio instances is configured to be operable for sharing subscriber identification module (SIM) information with user equipment.

3. The computing system of claim 1, wherein the computing system includes a router layer before the multiple software defined radio instances, the router layer configured to be operable for allowing the computing system to dynamically select one or more better performing antennas within the plurality of antennas for a current situation.

4. The computing system of claim 3, wherein the router layer is configured to be operable for allowing the computing system to dynamically select the one or more better performing antennas within the plurality of antennas depending on at least one of one or more downlink requirement, uplink requirement, or gain per antenna.

5. The computing system of claim 3, wherein the computing system is configured to be operable for reducing power of one or more lower performing antennas within the plurality of antennas that were not selected as one of the one or more better performing antennas for the current situation.

6. The computing system of claim 3, wherein the router layer is configured to be operable for allowing the computing system to dynamically select the one or more better performing antennas within the plurality of antennas depending on one or more criteria including: a high reliability communication and power and performance optimization, a current vehicle location, a rural location versus an urban location, a shadowing effect of the vehicle itself, and/or a shadowing effect of a nearby obstruction.

7. The computing system of claim 1, wherein the computing system is configured such that the multiple software defined radio instances are operable for sharing IQ data streams from the plurality of antennas.

8. The computing system of claim 1, wherein:
the multiple software defined radio instances include at least first and second software defined radio instances; and
the computing system is configured such that the first and second software defined radio instances are operable for respectively receiving first and second IQ data streams for respective first and second different carrier frequencies from a single antenna source among the plurality of antennas.

9. The computing system of claim 1, wherein the computing system is configured such that IQ data streams from one or more antennas among the plurality of antennas that are at one or more optimal locations for a current situation are routed to a highest priority software defined radio instance among the multiple software defined radio instances.

10. The computing system of claim 9, wherein the computing system is configured to be operable for routing IQ data streams to the highest priority software defined radio instance depending on one or more of: a high reliability communication and power and performance optimization, a current vehicle location, a rural location versus an urban location, a shadowing effect of the vehicle itself, and/or a shadowing effect of a nearby obstruction or obstructions.

11. The computing system of claim 1, wherein the computing system is configured to be operable for monitoring receive data strength at antenna locations of the plurality of antennas and using the monitored receive data strength to identify a best antenna location for a highest priority software defined radio instance among the multiple software defined radio instances, such that the highest priority software defined radio instance will receive IQ data streams from the antenna that is at the best antenna location.

12. The computing system of claim 1, wherein the computing system is configured to be operable for using required transmit or upload data rates to thereby allow a lower priority software defined radio instance among the multiple software defined radio instances to utilize an antenna location that is more optimal than an antenna location for a higher priority software defined radio instance among the multiple software defined radio instances when the higher priority software defined radio instance requires low data rates.

13. The computing system of claim 1, wherein the computing system is configured to be operable for reducing power of at least one antenna not being used within the plurality of antennas.

14. The computing system of claim 1, wherein the computing system is configured to be operable for:
actively selecting one or more antennas within the plurality of antennas based on a bandwidth requirement of user equipment with the vehicle; and
reducing power to the one or more antennas within the plurality of antennas that are not in use, that are not needed to satisfy the bandwidth requirement, or that have low power levels with effectively zero signal.

15. The computing system of claim 1, wherein the computing system is configured to be operable for:
actively selecting one or more antennas within the plurality of antennas based on receive power for a location and orientation in three-dimensional space of the vehicle; and
reducing power to the one or more antennas within the plurality of antennas that have a lower receive power than the actively selected one or more antennas.

16. The computing system of claim 1, wherein the computing system is configured to be operable for digitally combining IQ data streams from two or more antennas within the plurality of antennas into a combined digital IQ data stream and thereafter routing the combined digital IQ data stream to a baseband processor or a software defined radio instance among the multiple software defined radio instances.

17. The computing system of claim 1, wherein the computing system is configured to provide increased vehicle location accuracy of the vehicle, the computing system comprising a central unit configured for communication with the plurality of antennas, wherein the computing system is configured to be operable for using signals from the plurality of antennas at different antenna locations distributed in the vehicle for increased accuracy when determining a position of the vehicle.

18. The computing system of claim 1, wherein:
the computing system is configured such that the multiple software defined radio instances are operable for sharing IQ data streams from the plurality of antennas by using idle time in a network time slice for at least one other carrier and/or other application; and
the computing system is configured to switch to other carriers to support hand over and/or to support a second instance of a software defined radio to improve antenna usage in time.

19. The computing system of claim 1, wherein the computing system includes:
one or more central units onboard the vehicle; and
a link connecting each antenna to at least one of the one or more central units and configured to transmit signals digitally thereby enabling the plurality of antennas to communicate with and be monitored by the one or more central units;
whereby the computing system is configured to have redundancy and failover communications channels provided by the multiple software defined radio instances and the plurality of antennas.

20. The computing system of claim 1, wherein the computing system includes a dedicated emergency call (eCall) modem onboard the vehicle; and wherein the computing system is configured to:
communicate vehicle communications and non-safety related eCall messages through at least one of the multiple software defined radio instances during a normal operation of the multiple software defined radio instances; and
automatically failover to the dedicated eCall modem to maintain seamless eCall communication if the at least one of the multiple software defined radio instances cannot be maintained or is disabled.

21. The computing system of claim 1, wherein the multiple software defined radio instances include at least:
a first software defined radio instance configured for an original equipment manufacturer; and
a second software defined radio instance configured for user equipment.

22. The computing system of claim 1, wherein the computing system includes a modem software stack that comprises one or more of the multiple software defined radio instances.

23. The computing system of claim 1, wherein the computing system includes:
a central unit onboard the vehicle that includes the multiple software defined radio instances, the central unit configured to be connected with other vehicle functions or dedicated to hosting the multiple software defined radio instances;
the plurality of antennas that comprise multiple remote active antennas distributed in the vehicle; and
a link connecting each of the multiple remote active antennas to the central unit and configured to transmit signals digitally thereby enabling the multiple remote active antennas to communicate with the central unit digitally and enabling the multiple remote active antennas to be connected with the multiple software defined radio instances of the central unit.

24. A method for controlling and managing operation of a plurality of antennas distributed in a vehicle that also includes multiple software defined radio instances configured for communication with the plurality of antennas, the method comprising:
linking the plurality of antennas with the software defined radio instances;
selecting one or more in-phase quadrature (IQ) data streams to be routed from the plurality of antennas to at least one of the multiple software defined radio instances based on a priority of each of the multiple software defined radio instances, wherein at least two software defined radio instances of the multiple software defined radio instances share a same subscriber identification module (SIM) thereby enabling an increased data rate.

25. The computing system of claim 1, wherein the computing system is configured to be operable for selectively prioritizing and routing IQ data streams from the plurality of antennas to the software defined radio instances based on a prioritized ranking of the software defined radio instances.

* * * * *